(12) United States Patent
Warner

(10) Patent No.: US 7,566,955 B2
(45) Date of Patent: Jul. 28, 2009

(54) HIGH-FREQUENCY CHIP PACKAGES

(75) Inventor: Michael Warner, San Jose, CA (US)

(73) Assignee: Tessera, Inc., San Jose, CA (US)

( * ) Notice: Subject to any disclaimer, the term of this patent is extended or adjusted under 35 U.S.C. 154(b) by 502 days.

(21) Appl. No.: 10/488,210

(22) PCT Filed: Aug. 28, 2002

(86) PCT No.: PCT/US02/27509

§ 371 (c)(1),
(2), (4) Date: Oct. 13, 2004

(87) PCT Pub. No.: WO03/021673

PCT Pub. Date: Mar. 13, 2003

(65) Prior Publication Data

US 2005/0046001 A1 Mar. 3, 2005

Related U.S. Application Data

(63) Continuation-in-part of application No. 10/210,160, filed on Aug. 1, 2002, now Pat. No. 6,856,007.

(60) Provisional application No. 60/315,408, filed on Aug. 28, 2001.

(51) Int. Cl.
*H01L 23/02* (2006.01)

(52) U.S. Cl. .................. 257/678; 257/686; 257/777

(58) Field of Classification Search .................. 257/686, 257/687, 678, 719, 723, 724, 777, 697
See application file for complete search history.

(56) References Cited

U.S. PATENT DOCUMENTS

| 2,507,956 | A | 5/1950 | Bruno |
| 2,796,370 | A | 6/1957 | Ostrander |
| 2,851,385 | A | 9/1958 | Spruance, Jr. |
| 3,648,131 | A | 3/1972 | Stuby |

(Continued)

FOREIGN PATENT DOCUMENTS

EP 0 506 491 9/1992

(Continued)

OTHER PUBLICATIONS

U.S. Appl. No. 09/119,079, Haba.

(Continued)

*Primary Examiner*—Thinh T Nguyen
(74) *Attorney, Agent, or Firm*—Lerner, David, Littenberg, Krumholz & Mentlik, LLP

(57) ABSTRACT

A packaged semiconductor chip includes features such as a chip carrier having a large thermal conductor which can be solder-bonded to a circuit board so as to provide enhanced thermal conductivity to the circuit board and electromagnetic shielding and a conductive enclosure which partially or completely surrounds the packaged chip to provide additional heat dissipation and shielding. The packaged unit may include both an active semiconductor chip and a passive element, desirably in the form of a chip, which includes resistors and capacitors. Inductors may be provided in whole or in part on the chip carrier. A module includes two circuits and an enclosure with a medial wall between the circuits to provide electromagnetic shielding between the circuits.

21 Claims, 14 Drawing Sheets

U.S. PATENT DOCUMENTS

| | | | |
|---|---|---|---|
| 3,761,782 A | 9/1973 | Youmans | |
| 3,981,023 A | 9/1976 | King et al. | |
| 4,259,679 A | 3/1981 | Knibb et al. | |
| 4,279,690 A | 7/1981 | Dierschke | |
| 4,339,689 A | 7/1982 | Yamanaka et al. | |
| 4,551,629 A | 11/1985 | Carson et al. | |
| 4,764,846 A | 8/1988 | Go | |
| 4,774,630 A | 9/1988 | Reisman et al. | |
| 4,794,092 A | 12/1988 | Solomon | |
| 4,797,179 A | 1/1989 | Watson et al. | |
| 4,806,106 A | 2/1989 | Mebane et al. | |
| 4,825,284 A | 4/1989 | Soga et al. | |
| 4,827,376 A | 5/1989 | Voss | |
| 4,862,197 A | 8/1989 | Stoffel | |
| 4,862,249 A | 8/1989 | Carlson | |
| 4,933,601 A | 6/1990 | Sagawa et al. | |
| 4,984,358 A | 1/1991 | Nelson | |
| 5,070,297 A | 12/1991 | Kwon et al. | |
| 5,072,520 A | 12/1991 | Nelson | |
| 5,104,820 A | 4/1992 | Go et al. | |
| 5,118,924 A | 6/1992 | Mehra et al. | |
| 5,124,543 A | 6/1992 | Kawashima | |
| 5,126,286 A | 6/1992 | Chance | |
| 5,148,265 A | 9/1992 | Khandros et al. | |
| 5,148,266 A | 9/1992 | Khandros et al. | |
| 5,177,753 A | 1/1993 | Tanaka | |
| 5,187,122 A | 2/1993 | Bonis | |
| 5,198,963 A | 3/1993 | Gupta et al. | |
| 5,220,838 A | 6/1993 | Fung et al. | |
| 5,250,462 A | 10/1993 | Sasaki et al. | |
| 5,266,501 A | 11/1993 | Imai | |
| 5,266,833 A | 11/1993 | Capps | |
| 5,285,352 A | 2/1994 | Pastore et al. | |
| 5,321,303 A | 6/1994 | Kawahara et al. | |
| 5,335,210 A | 8/1994 | Bernstein | |
| 5,347,159 A | 9/1994 | Khandros et al. | |
| 5,382,829 A | 1/1995 | Inoue | |
| 5,390,844 A | 2/1995 | Distefano et al. | |
| 5,398,863 A | 3/1995 | Grube et al. | |
| 5,438,305 A | 8/1995 | Hikita et al. | |
| 5,448,014 A | 9/1995 | Kong et al. | |
| 5,473,190 A | 12/1995 | Inoue et al. | |
| 5,486,720 A | 1/1996 | Kierse | |
| 5,491,302 A | 2/1996 | Distefano et al. | |
| 5,500,540 A | 3/1996 | Jewell et al. | |
| 5,504,035 A | 4/1996 | Rostoker et al. | |
| 5,518,964 A | 5/1996 | DiStefano et al. | |
| 5,526,449 A | 6/1996 | Meade et al. | |
| 5,530,288 A | 6/1996 | Stone | |
| 5,536,909 A | 7/1996 | DiStefano et al. | |
| 5,546,654 A | 8/1996 | Wojnarowski et al. | |
| 5,557,501 A | 9/1996 | DiStefano et al. | |
| 5,567,657 A | 10/1996 | Wojnarowski et al. | |
| 5,576,680 A | 11/1996 | Ling | |
| 5,578,874 A | 11/1996 | Kurogi et al. | |
| 5,595,930 A | 1/1997 | Baek | |
| 5,608,262 A * | 3/1997 | Degani et al. | 257/723 |
| 5,610,431 A | 3/1997 | Martin | |
| 5,612,570 A | 3/1997 | Eide et al. | |
| 5,629,239 A | 5/1997 | DiStefano et al. | |
| 5,629,241 A | 5/1997 | Matloubian et al. | |
| 5,633,785 A | 5/1997 | Parker et al. | |
| 5,642,261 A | 6/1997 | Bond et al. | |
| 5,657,206 A | 8/1997 | Pedersen et al. | |
| 5,659,952 A | 8/1997 | Kovac et al. | |
| 5,661,087 A | 8/1997 | Pedersen et al. | |
| 5,668,033 A | 9/1997 | Ohara et al. | |
| 5,672,519 A | 9/1997 | Song et al. | |
| 5,675,180 A | 10/1997 | Pedersen et al. | |
| 5,677,200 A | 10/1997 | Park et al. | |
| 5,677,569 A | 10/1997 | Choi et al. | |
| 5,679,977 A | 10/1997 | Khandros et al. | |
| 5,688,716 A | 11/1997 | DiStefano et al. | |
| 5,703,400 A | 12/1997 | Wojnarowski et al. | |
| 5,705,858 A | 1/1998 | Tsukamoto | |
| 5,706,174 A | 1/1998 | Distefano et al. | |
| 5,707,174 A | 1/1998 | Distefano et al. | |
| 5,717,245 A | 2/1998 | Pedder | |
| 5,747,870 A | 5/1998 | Pedder | |
| 5,757,074 A | 5/1998 | Matloubian et al. | |
| 5,766,987 A | 6/1998 | Mitchell et al. | |
| 5,787,581 A | 8/1998 | DiStefano et al. | |
| 5,798,286 A | 8/1998 | Faraci et al. | |
| 5,798,557 A | 8/1998 | Salatino et al. | |
| 5,801,474 A | 9/1998 | Sakairi et al. | |
| 5,814,894 A | 9/1998 | Igarashi et al. | |
| 5,817,541 A | 10/1998 | Averkiou et al. | |
| 5,821,609 A | 10/1998 | DiStefano et al. | |
| 5,830,782 A | 11/1998 | Smith et al. | |
| 5,837,562 A | 11/1998 | Cho | |
| 5,837,566 A | 11/1998 | Pedersen et al. | |
| 5,849,623 A | 12/1998 | Wojnarowski et al. | |
| 5,857,858 A | 1/1999 | Gorowitz et al. | |
| 5,859,475 A | 1/1999 | Freyman et al. | |
| 5,869,353 A | 2/1999 | Levy et al. | |
| 5,869,887 A | 2/1999 | Urushima | |
| 5,869,894 A * | 2/1999 | Degani et al. | 257/723 |
| 5,872,697 A | 2/1999 | Christensen et al. | |
| 5,886,393 A | 3/1999 | Merrill et al. | |
| 5,888,884 A | 3/1999 | Wojnarowski | |
| 5,891,761 A | 4/1999 | Vindasius et al. | |
| 5,892,417 A | 4/1999 | Johnson et al. | |
| 5,895,233 A | 4/1999 | Higashi et al. | |
| 5,895,972 A | 4/1999 | Paniccia | |
| 5,900,674 A | 5/1999 | Wojnarowski et al. | |
| 5,905,639 A | 5/1999 | Warren | |
| 5,909,052 A | 6/1999 | Ohta et al. | |
| 5,910,687 A | 6/1999 | Chen et al. | |
| 5,913,109 A | 6/1999 | Distefano et al. | |
| 5,915,168 A | 6/1999 | Salatino et al. | |
| 5,915,752 A | 6/1999 | DiStefano et al. | |
| 5,918,112 A | 6/1999 | Shah et al. | |
| 5,920,142 A | 7/1999 | Onishi et al. | |
| 5,929,517 A | 7/1999 | Distefano et al. | |
| 5,938,452 A | 8/1999 | Wojnarowski | |
| 5,952,712 A | 9/1999 | Ikuina et al. | |
| 5,965,933 A | 10/1999 | Young et al. | |
| 5,973,391 A | 10/1999 | Bischoff et al. | |
| 5,976,913 A | 11/1999 | Distefano et al. | |
| 5,985,695 A | 11/1999 | Freyman et al. | |
| 5,986,746 A | 11/1999 | Metz et al. | |
| 5,991,989 A | 11/1999 | Onishi et al. | |
| 5,993,981 A | 11/1999 | Askinazi et al. | |
| 6,002,163 A | 12/1999 | Wojnarowski | |
| 6,005,466 A | 12/1999 | Pedder | |
| 6,011,330 A | 1/2000 | Goodman et al. | |
| 6,020,217 A | 2/2000 | Kuisl et al. | |
| 6,037,659 A | 3/2000 | Weixel | |
| 6,046,076 A | 4/2000 | Mitchell et al. | |
| 6,046,410 A | 4/2000 | Wojnarowski et al. | |
| 6,049,470 A | 4/2000 | Weale | |
| 6,049,972 A | 4/2000 | Link et al. | |
| 6,054,756 A | 4/2000 | DiStefano et al. | |
| 6,072,236 A | 6/2000 | Akram et al. | |
| 6,075,289 A | 6/2000 | Destefano | |
| 6,080,596 A | 6/2000 | Vindasius et al. | |
| 6,081,035 A | 6/2000 | Warren et al. | |
| 6,092,280 A | 7/2000 | Wojnarowski | |
| 6,093,888 A | 7/2000 | Laureanti et al. | |
| 6,094,138 A | 7/2000 | Eberhardt et al. | |
| 6,098,278 A | 8/2000 | Vindasius et al. | |
| 6,100,594 A | 8/2000 | Fukui et al. | |
| 6,104,272 A | 8/2000 | Yamamoto et al. | |
| 6,121,676 A | 9/2000 | Solberg | |

| | | | |
|---|---|---|---|
| 6,122,009 A | 9/2000 | Ueda et al. | |
| 6,124,179 A | 9/2000 | Adamic, Jr. | |
| 6,124,546 A | 9/2000 | Hayward et al. | |
| 6,124,637 A | 9/2000 | Freyman et al. | |
| 6,133,626 A | 10/2000 | Hawke et al. | |
| 6,134,118 A | 10/2000 | Pedersen et al. | |
| 6,140,144 A | 10/2000 | Najafi et al. | |
| 6,156,652 A | 12/2000 | Michalicek | |
| 6,156,980 A | 12/2000 | Peugh et al. | |
| 6,165,814 A | 12/2000 | Wark et al. | |
| 6,169,328 B1 | 1/2001 | Mitchell et al. | |
| 6,181,015 B1 | 1/2001 | Gotoh et al. | |
| 6,194,774 B1 | 2/2001 | Cheon | |
| 6,214,644 B1 | 4/2001 | Glenn | |
| 6,218,729 B1 * | 4/2001 | Zavrel et al. | 257/698 |
| 6,221,751 B1 | 4/2001 | Chen et al. | |
| 6,225,688 B1 | 5/2001 | Kim et al. | |
| 6,225,694 B1 * | 5/2001 | Terui | 257/704 |
| 6,228,686 B1 | 5/2001 | Smith et al. | |
| 6,229,200 B1 | 5/2001 | Mclellan et al. | |
| 6,229,427 B1 | 5/2001 | Kurtz et al. | |
| 6,235,141 B1 | 5/2001 | Feldman et al. | |
| 6,238,949 B1 | 5/2001 | Nguyen et al. | |
| 6,238,950 B1 | 5/2001 | Howser et al. | |
| 6,249,039 B1 | 6/2001 | Harvey et al. | |
| 6,252,778 B1 | 6/2001 | Tonegawa et al. | |
| 6,255,714 B1 | 7/2001 | Kossives et al. | |
| 6,261,945 B1 | 7/2001 | Nye, III et al. | |
| 6,265,246 B1 | 7/2001 | Ruby et al. | |
| 6,265,763 B1 | 7/2001 | Jao et al. | |
| 6,274,937 B1 | 8/2001 | Ahn et al. | |
| 6,279,227 B1 | 8/2001 | Khandros et al. | |
| 6,281,570 B1 | 8/2001 | Kameyama et al. | |
| 6,285,064 B1 | 9/2001 | Foster | |
| 6,292,086 B1 | 9/2001 | Chu | |
| 6,309,910 B1 | 10/2001 | Haba et al. | |
| 6,310,386 B1 | 10/2001 | Shenoy | |
| 6,316,840 B1 | 11/2001 | Otani et al. | |
| 6,321,444 B1 | 11/2001 | Yatsuda et al. | |
| 6,323,735 B1 | 11/2001 | Welland et al. | |
| 6,326,689 B1 | 12/2001 | Thomas | |
| 6,326,696 B1 | 12/2001 | Horton et al. | |
| 6,326,697 B1 | 12/2001 | Farnworth | |
| 6,329,715 B1 | 12/2001 | Hayashi | |
| 6,342,406 B1 | 1/2002 | Glenn et al. | |
| 6,344,688 B1 | 2/2002 | Wang | |
| 6,353,263 B1 | 3/2002 | Dotta et al. | |
| 6,362,525 B1 | 3/2002 | Rahim | |
| 6,366,629 B1 | 4/2002 | Chen et al. | |
| 6,373,130 B1 | 4/2002 | Salaville | |
| 6,376,279 B1 | 4/2002 | Kwon et al. | |
| 6,377,464 B1 | 4/2002 | Hashemi et al. | |
| 6,384,397 B1 | 5/2002 | Takiar et al. | |
| 6,387,747 B1 | 5/2002 | Cha et al. | |
| 6,387,793 B1 | 5/2002 | Yap et al. | |
| 6,396,043 B1 | 5/2002 | Glenn et al. | |
| 6,396,116 B1 | 5/2002 | Kelly et al. | |
| 6,396,470 B1 | 5/2002 | Zhang et al. | |
| 6,404,131 B1 | 6/2002 | Kawano et al. | |
| 6,420,208 B1 | 7/2002 | Pozder et al. | |
| 6,429,036 B1 | 8/2002 | Nixon et al. | |
| 6,429,511 B2 | 8/2002 | Ruby et al. | |
| 6,441,481 B1 | 8/2002 | Karpman | |
| 6,449,828 B2 | 9/2002 | Pahl et al. | |
| 6,452,238 B1 | 9/2002 | Orcutt et al. | |
| 6,480,389 B1 | 11/2002 | Shie et al. | |
| 6,492,194 B1 | 12/2002 | Bureau et al. | |
| 6,492,201 B1 | 12/2002 | Haba | |
| 6,493,240 B2 | 12/2002 | Broglia et al. | |
| 6,493,861 B1 | 12/2002 | Li et al. | |
| 6,498,099 B1 | 12/2002 | McLellan et al. | |
| 6,498,381 B2 | 12/2002 | Halahan et al. | |
| 6,521,987 B1 | 2/2003 | Glenn et al. | |
| 6,548,911 B2 | 4/2003 | Yu et al. | |
| 6,550,664 B2 | 4/2003 | Bradley et al. | |
| 6,552,475 B2 | 4/2003 | Hori et al. | |
| 6,555,901 B1 | 4/2003 | Yoshihara et al. | |
| 6,562,647 B2 | 5/2003 | Zandman et al. | |
| 6,583,444 B2 | 6/2003 | Fjelstad | |
| 6,583,513 B1 | 6/2003 | Utagikar et al. | |
| 6,596,634 B2 | 7/2003 | Umetsu et al. | |
| 6,607,941 B2 | 8/2003 | Prabhu et al. | |
| 6,621,163 B2 | 9/2003 | Weekamp et al. | |
| 6,624,505 B2 | 9/2003 | Badehi | |
| 6,627,864 B1 | 9/2003 | Glenn et al. | |
| 6,627,985 B2 | 9/2003 | Huppenthal et al. | |
| 6,627,998 B1 | 9/2003 | Caletka et al. | |
| 6,646,289 B1 | 11/2003 | Badehi | |
| 6,656,827 B1 | 12/2003 | Tsao et al. | |
| 6,657,296 B2 | 12/2003 | Ho et al. | |
| 6,664,624 B2 | 12/2003 | Haematsu et al. | |
| 6,670,206 B2 | 12/2003 | Kim et al. | |
| 6,670,215 B2 | 12/2003 | Miyazaki et al. | |
| 6,674,159 B1 | 1/2004 | Peterson et al. | |
| 6,678,167 B1 | 1/2004 | Degani et al. | |
| 6,693,361 B1 | 2/2004 | Siniaguine et al. | |
| 6,699,730 B2 | 3/2004 | Kim et al. | |
| 6,710,456 B1 | 3/2004 | Jiang et al. | |
| 6,717,254 B2 | 4/2004 | Siniaguine | |
| 6,734,040 B2 | 5/2004 | Yamaguchi et al. | |
| 6,744,109 B2 | 6/2004 | Barton et al. | |
| 6,753,205 B2 | 6/2004 | Halahan | |
| 6,768,190 B2 | 7/2004 | Yang et al. | |
| 6,784,020 B2 | 8/2004 | Lee et al. | |
| 6,787,916 B2 | 9/2004 | Halahan | |
| 6,798,070 B2 | 9/2004 | Funaya et al. | |
| 6,809,412 B1 | 10/2004 | Tourino et al. | |
| 6,818,545 B2 | 11/2004 | Lee et al. | |
| 6,822,324 B2 | 11/2004 | Tao et al. | |
| 6,830,877 B2 | 12/2004 | Ma et al. | |
| 6,849,916 B1 | 2/2005 | Glenn et al. | |
| 6,903,012 B2 | 6/2005 | Geefay et al. | |
| 6,903,883 B2 | 6/2005 | Amanai et al. | |
| 6,933,616 B2 | 8/2005 | Fang | |
| 6,940,158 B2 | 9/2005 | Haba et al. | |
| 6,972,480 B2 | 12/2005 | Zilber et al. | |
| 6,982,475 B1 | 1/2006 | MacIntyre | |
| 6,995,462 B2 | 2/2006 | Bolken et al. | |
| 7,033,664 B2 | 4/2006 | Zilber et al. | |
| 7,265,440 B2 | 9/2007 | Zilber et al. | |
| 2001/0009300 A1 | 7/2001 | Sugimura | |
| 2001/0013653 A1 | 8/2001 | Shoji | |
| 2001/0033478 A1 | 10/2001 | Ortiz et al. | |
| 2002/0016024 A1 | 2/2002 | Thomas | |
| 2002/0017699 A1 | 2/2002 | Shenoy | |
| 2002/0056900 A1 | 5/2002 | Liu et al. | |
| 2002/0074668 A1 | 6/2002 | Hofstee et al. | |
| 2002/0089835 A1 | 7/2002 | Simmons | |
| 2002/0090803 A1 | 7/2002 | Salaville | |
| 2002/0102004 A1 | 8/2002 | Minervini | |
| 2002/0170175 A1 | 11/2002 | Aigner et al. | |
| 2002/0195700 A1 | 12/2002 | Li | |
| 2003/0001252 A1 | 1/2003 | Ku et al. | |
| 2003/0025204 A1 | 2/2003 | Sakai | |
| 2003/0038327 A1 | 2/2003 | Smith | |
| 2003/0047797 A1 | 3/2003 | Kuan et al. | |
| 2003/0052404 A1 | 3/2003 | Thomas | |
| 2003/0067073 A1 | 4/2003 | Akram et al. | |
| 2003/0133588 A1 | 7/2003 | Pedersen | |
| 2003/0148578 A1 | 8/2003 | Ku et al. | |
| 2003/0151139 A1 | 8/2003 | Kimura | |
| 2003/0159276 A1 | 8/2003 | Wakefield | |
| 2003/0168725 A1 | 9/2003 | Warner et al. | |
| 2004/0007774 A1 | 1/2004 | Crane, Jr. et al. | |
| 2004/0041249 A1 | 3/2004 | Tsai et al. | |
| 2004/0099917 A1 | 5/2004 | Greathouse et al. | |

| | | |
|---|---|---|
| 2004/0099938 A1 | 5/2004 | Kang et al. |
| 2004/0104261 A1 | 6/2004 | Sterrett et al. |
| 2004/0104470 A1 | 6/2004 | Bang et al. |
| 2004/0115866 A1 | 6/2004 | Bang et al. |
| 2004/0145054 A1 | 7/2004 | Bang et al. |
| 2004/0166662 A1 | 8/2004 | Lei |
| 2004/0238934 A1 | 12/2004 | Warner et al. |
| 2005/0017348 A1 | 1/2005 | Haba et al. |
| 2005/0067681 A1 | 3/2005 | De Villeneuve et al. |
| 2005/0067688 A1 | 3/2005 | Humpston |
| 2005/0082653 A1 | 4/2005 | McWilliams et al. |
| 2005/0082654 A1 | 4/2005 | Humpston et al. |
| 2005/0085016 A1 | 4/2005 | McWilliams et al. |
| 2005/0087861 A1 | 4/2005 | Burtzlaff et al. |
| 2005/0095835 A1 | 5/2005 | Humpston et al. |
| 2005/0104179 A1 | 5/2005 | Zilber et al. |
| 2005/0116344 A1 | 6/2005 | Humpston |
| 2005/0139984 A1 | 6/2005 | Tuckerman et al. |
| 2005/0142685 A1 | 6/2005 | Ouellet et al. |
| 2005/0167773 A1 | 8/2005 | Ozawa et al. |
| 2005/0170656 A1 | 8/2005 | Nasiri et al. |
| 2005/0189622 A1 | 9/2005 | Humpston et al. |
| 2005/0189635 A1 | 9/2005 | Humpston et al. |
| 2005/0205977 A1 | 9/2005 | Zilber et al. |
| 2005/0236684 A1 | 10/2005 | Chen et al. |
| 2005/0248680 A1 | 11/2005 | Humpston |
| 2005/0258518 A1 | 11/2005 | Yang et al. |
| 2005/0279916 A1 | 12/2005 | Kang et al. |
| 2006/0044450 A1 | 3/2006 | Wolterink et al. |
| 2006/0081983 A1 | 4/2006 | Humpston et al. |
| 2006/0091488 A1 | 5/2006 | Kang et al. |
| 2006/0110854 A1 | 5/2006 | Horning et al. |
| 2006/0141665 A1 | 6/2006 | Mohammed |
| 2006/0278997 A1 | 12/2006 | Gibson et al. |
| 2007/0042527 A1 | 2/2007 | Tuckerman et al. |
| 2007/0138644 A1 | 6/2007 | McWilliams et al. |

FOREIGN PATENT DOCUMENTS

| | | |
|---|---|---|
| EP | 0 585 186 A | 3/1994 |
| EP | 0 828 346 | 3/1998 |
| EP | 1 071 126 A | 1/2001 |
| EP | 1 357 741 A | 10/2003 |
| GB | 2392555 | 3/2004 |
| JP | 05-04762 | 2/1993 |
| JP | 07-202157 | 8/1995 |
| JP | 08-213874 A | 8/1996 |
| JP | 11-326366 | 11/1999 |
| WO | WO-85/02283 | 5/1985 |
| WO | WO-89/04113 | 5/1989 |
| WO | WO-95/19645 | 7/1995 |
| WO | WO-97/11588 A1 | 3/1997 |
| WO | WO-02/058233 A | 7/2002 |
| WO | WO-2004/017399 | 2/2004 |
| WO | WO-2004/023546 | 3/2004 |
| WO | WO-2004/025699 | 3/2004 |
| WO | WO-2004/027880 A | 4/2004 |

OTHER PUBLICATIONS

PCT/US96/14965, filed Sep. 18, 1996, Fjelstad et al.

U.S. Appl. No. 10/077,388, filed Feb. 15, 2002, assigned to Tessera, Inc., now Abandoned.

* cited by examiner

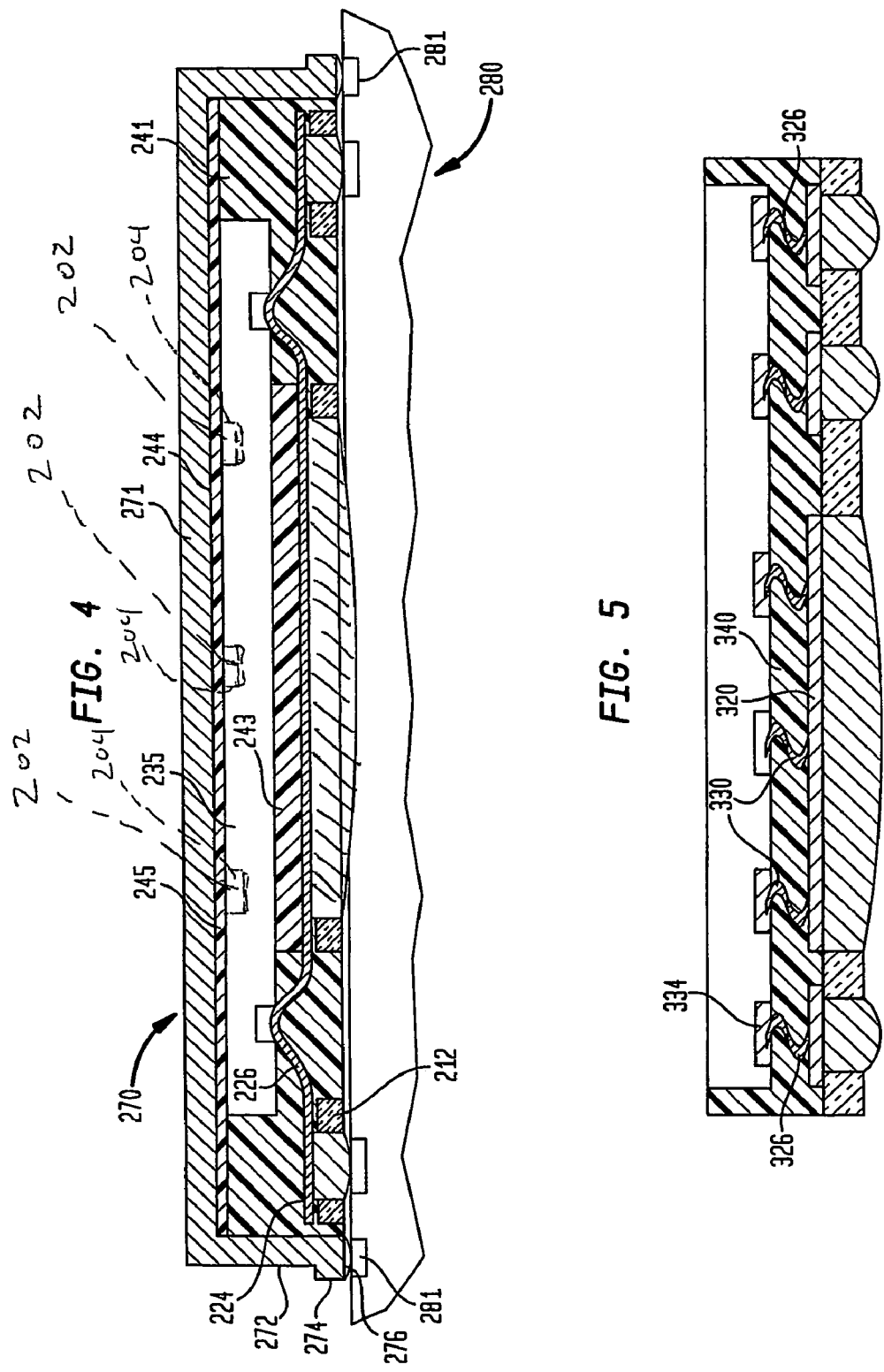

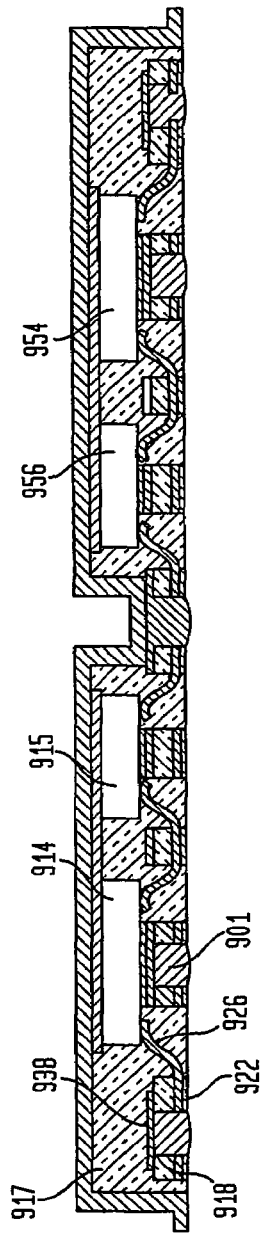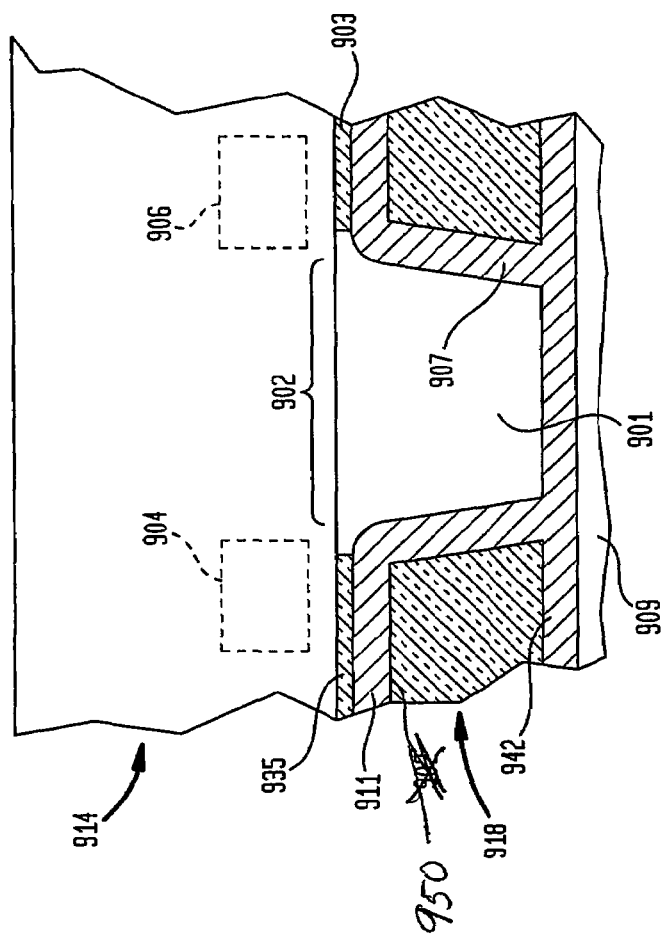

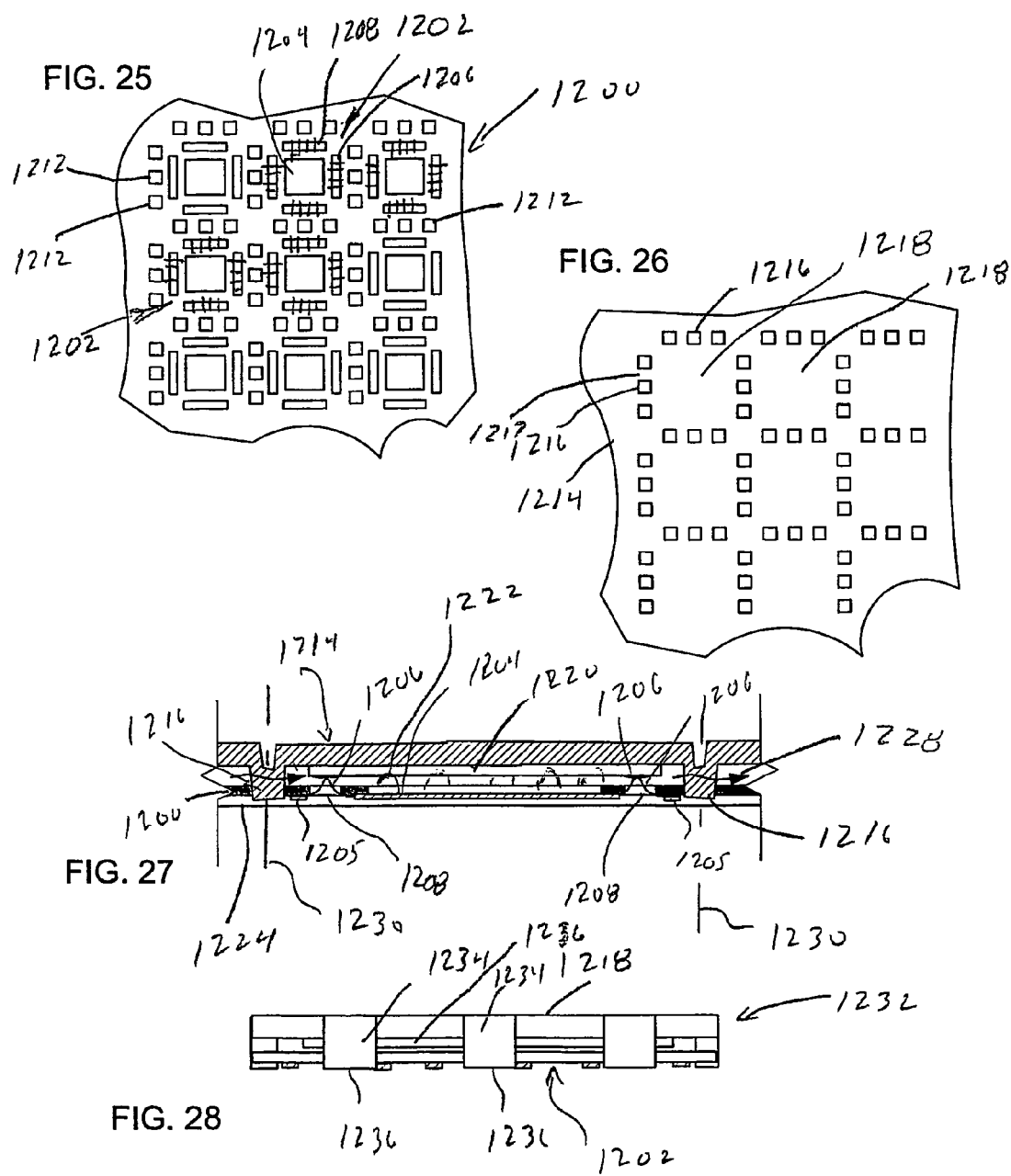

HIGH-FREQUENCY CHIP PACKAGES

CROSS-REFERENCE TO RELATED APPLICATIONS

This application is the National Stage of International Application No. PCT/US02/27509, filed Aug. 28, 2002, designating the United States. Said international application claims the benefit of U.S. Provisional Patent Application No. 60/315,408 filed Aug. 28, 2001. Said international application is also a continuation-in-part of U.S. patent application Ser. No. 10/210,160, filed Aug. 1, 2002, which application also claims the benefit of said U.S. Provisional Patent Application No. 60/315,408. The disclosure of all of the aforesaid applications are hereby incorporated by reference herein.

BACKGROUND OF THE INVENTION

The present application relates to the art of packaging microelectronic elements such as semiconductor chips.

Semiconductor chips or dies commonly are provided in packages which facilitate handling of the chip during manufacture and mounting of the chip on an external substrate such as a circuit board or other circuit panel. For example, certain packaged semiconductor chips sold under the registered trademark µBGA® by Tessera, Inc., assignee of the present application, incorporate a dielectric element having terminals. The terminals are connected to contacts on the die itself. In particularly preferred arrangements, the connections between the terminals and the die are formed by flexible leads and the dielectric element, its mounting to the die or both are arranged so that the terminals remain moveable with respect to the chip. For example, where the dielectric element overlies a surface of the chip, a layer of a compliant material may be provided between the dielectric element and the chip. The packaged chip can be mounted to a circuit board or other underlying circuit panel by soldering or otherwise bonding the terminals on the dielectric element to contact pads on the circuit board. Because the terminals on the dielectric element can move relative to the chip, the assembly can compensate for differential thermal expansion and contraction of the chip and the circuit board during thermal cycling in service, in storage and during manufacturing processes.

Assemblies of this type are described, for example, in U.S. Pat. Nos. 5,148,265; 5,148,266; and 5,679,977. In certain embodiments, the leads can be formed partially or wholly as elongated metallic strips extending from the terminals along the dielectric element. These strips can be connected to the contacts on the chip by wire bonds, so that the wire bonds and strips cooperatively constitute composite leads. In other embodiments, the strips themselves can be connected directly to the terminals. Certain methods of forming strip-like leads and connecting numerous strip-like leads to numerous contacts on a die are described in U.S. Pat. Nos. 6,054,756; 5,915,752; 5,787,581; 5,536,909; 5,390,844; 5,491,302; 5,821,609; and 6,081,035, the disclosures of which are incorporated by reference herein.

The aforementioned structures, in their preferred embodiments, provide packaged chips with numerous advantageous including the aforementioned ability to compensate for differential thermal expansion and hence high reliability; compatibility with surface-mounting techniques for assembling components to a circuit board and the ability to accommodate numerous connections to the chip in a compact assembly. Some of these packages occupy an area of the circuit board just slightly larger than the area of the chip itself. Certain preferred packages of this type provide short, strip-like leads which minimize self-inductance in the leads and hence provide good high-frequency signal propagation. Moreover, certain packages according to this design can provide good heat dissipation from the chip. These packages have been widely adopted for semiconductor chips in numerous applications.

However, despite these advancements in the art, still further improvement and optimization would be desirable. Chips used for generating or processing radio frequency ("RF") signals, commonly referred to as "RF chips", are used in numerous devices including cellular telephones and wireless data communication devices. RF chips typically generate substantial amounts of heat. Although RF chips typically have only a moderate number of input/output connections, and hence require only a moderate number of connections to the circuit board, these connections should be made with low-inductance leads having controlled, predictable impendence at the frequencies handled by the chip. The packages for RF chips should be compact and economical. Moreover, it would be desirable to provide packages which are particularly well suited to RF chips using the same production equipment and techniques used with other package designs as, for example, the µBGA® chips.

SUMMARY OF THE INVENTION

One aspect of the present invention provides a semiconductor chip assembly. A semiconductor chip assembly according to this aspect of the invention desirably includes a packaged semiconductor chip incorporating a semiconductor die having a front surface, a rear surface and contacts exposed at the front surface. The packaged semiconductor chip also includes a chip carrier having inner and outer surfaces. The inner surface of the chip carrier faces toward the front surface of the die. The chip carrier also has a plurality of terminals and a thermally conductor, preferably formed from a metallic material, exposed at the outer surface of the chip carrier. The thermal conductor has a relatively large area, substantially larger than the area of each individual terminal. The thermal conductor may have an area of at least 10 times, and desirably at least 20 times, the area of a single terminal. The thermal conductor is at least partially aligned with the die. The terminals on the chip carrier optionally may be movable with respect to the die. The thermal conductor optionally may be movable with respect to the die. An encapsulant layer may be provided between the die and the chip carrier, and between the die and the thermal conductor.

The circuit panel has contact pads and has a thermal conductor mounting. The pads and thermal conductor mounting typically are metallic. The packaged chip is disposed on the circuit panel so that the outer surface of the chip carrier faces toward the circuit panel. The terminals of the chip carrier are bonded to the contact pads of the circuit panel. Most desirably, the thermal conductor of the chip carrier is also bonded to the thermal conductor mounting of the circuit panel, and this bond preferably is a metallurgical bond. As used in the disclosure, the term "metallurgical bond" refers to a connection between elements formed substantially or entirely from one or more metals or alloys. The thermal conductor and the bond between the thermal conductor and the thermal conductor mounting on the circuit panel provide a low thermal resistance cooling path between the packaged chip and the circuit panel. Moreover, the thermal conductor can attenuate undesired RF emissions from the chip and/or RF signals impinging on the chip from other portions of the circuit, and can also be referred to as a "shield." Most desirably, the thermal conductor mounting of the circuit panel is connected to a ground or power voltage source and the thermal conductor is electrically connected to one or more ground or power contacts on the die by thermal conductor leads similar to those used to connect the other contacts with the terminals. Thus, the thermal conductor can act as a very large ground or power terminal. Because the thermal conductor has a substantial horizontal extent, the thermal conductor can also act as a ground or power distribution bus; in this case, the thermal conductor is electrically connected to numerous ground contacts or numerous power contacts at widely spaced locations on the die. In a variant of this approach, the thermal conductor may serve as a clock terminal and/or clock distribution bus, in which case the thermal conductor mount on the circuit panel is connected to a clock signal bus so that the clock signal is routed between the clock signal bus and the clock contacts of the chip.

In certain embodiments, the packaged chip may include a metallic heat spreader or "can" having a main or top wall structure overlying the rear surface of the chip so that a portion of the heat spreader faces upwardly, away from the circuit panel when the packaged chip is assembled to the circuit panel. The heat spreader desirably has a side wall projecting from the main portion of the heat spreader towards the front surface of the die. This wall desirably terminates in a horizontal surface or flange. In the assembly, the horizontal surface or flange of the heat spreader desirably is metallurgically bonded to a spreader mounting on the circuit panel. The spreader facilitates heat transfer from the packaged chip into the surroundings, away from the circuit panel. Where the spreader is bonded to the circuit panel, the spreader can also facilitate transfer of heat from the packaged chip into the circuit panel. The spreader can also serve as an RF shield, as a ground connection to the rear surface of the chip, or both. In an alternative arrangement, the side wall structure is bonded to a metallic feature on the chip carrier, which in turn is bonded to a mating feature of the circuit panel.

Yet another aspect of the invention provides packaged chips having features as discussed above in connection with the assembly.

A still further aspect of the invention provides connection components suitable for use in fabricating the packaged chips. Connection components according to this aspect of the invention most preferably include a dielectric layer having an inner surface and an outer surface, a metallic thermal conductor occupying at least a part of the dielectric layer, and terminals on the dielectric layer. The thermal conductor has an area substantially larger than the area of each individual terminal. The terminals and the thermal conductor are exposed at the outer surface of the dielectric layer. For example, the terminals and the thermal conductor may overlie the outer surface. Alternatively, the terminals and the thermal conductor may be disposed on the inner surface and openings in the dielectric layer may be provided in alignment with the terminals and the thermal conductor. The connection component desirably includes terminal leads electrically and physically connected to the terminals and most preferably includes one or more thermal conductor leads electrically and physically connected to the thermal conductor. The terminals, leads and thermal conductor are arranged so that when the leads are connected to the contacts on the die the thermal conductor overlies the front surface of the die. For example, the thermal conductor may be disposed in a central region of the dielectric layer, and at least some of the terminals may be disposed in a peripheral region of the dielectric layer surrounding the central region.

Most desirably, the terminals, lead and thermal conductor are all formed in a single metallization layer as, for example, by etching a single layer of metal. In one preferred arrangement, the leads extend across gaps in the dielectric layer so that the leads can be engaged with contacts on the chip during formation of a chip package by advancing a bonding tool into the gap so as to force the leads into engagement with the contacts on the chip. Most desirably, each lead includes a connection section which will be engaged with a contact on the chip and a frangible section weaker than the connection section. The frangible sections of the terminal leads may be disposed between the connection sections of these leads and the thermal conductor. Thus, prior to assembly with the chip, the terminals and terminal leads are electrically connected in common by the thermal conductor. However, when the frangible sections of the terminal leads are broken, the terminal leads are electrically disconnected from the thermal conductor. This allows use of the thermal conductor as a commoning bus during fabrication of the leads as, for example, in electroplating or etching operations.

A further aspect of the invention provides a packaged semiconductor chip. The packaged chip according to this aspect of the invention desirably includes a first semiconductor chip having an upwardly-facing front face, a downwardly-facing rear face, edges bounding said faces and contacts exposed at said front surface, said first semiconductor chip including active components. A connecting element including passive components such as resistors, capacitors and inductors is electrically connected to at least some of the contacts of the first chip. The connecting element overlies the front face of the first chip and projects outwardly beyond the edges of the first chip. A chip carrier is disposed below the rear surface of the first chip. The chip carrier has a bottom surface facing downwardly away from the first chip and has a plurality of terminals exposed at the bottom surface, at least some of such terminals being electrically connected to at least some of the contacts of the first chip through said connecting element. Most preferably, the connecting element is a second chip incorporating the passive elements, also referred to as a "passive chip." The chip carrier may include a thermal conductor as discussed above, and may also include a spreader or enclosure having a top wall overlying the rear surface of the connecting element or passive chip. As discussed above, these features provide further enhanced thermal dissipation and electromagnetic shielding.

In a packaged chip according to a further aspect of the invention, the position and orientation of the first chip and the connecting element or passive chip are reversed, so that the first chip lies above the passive chip. In this arrangement, the front surface of the first or active chip faces downwardly and confronts the upwardly-facing surface of the second or passive chip. The rear surface of the passive chip faces downwardly, toward the chip carrier. Chip assemblies according to this aspect of the present invention may also include thermal conductors and spreaders as discussed above.

Yet another aspect of the present invention provides packaged modules including two separate microelectronic circuits a pair of separate radio frequency amplification circuits. A packaged module according to this aspect of the invention includes a carrier having top and bottom surfaces and having terminals exposed at the bottom surface. A first microelectronic unit or assemblage including one or more chips is mounted to the carrier and overlies a first region of the top surface. A second microelectronic unit or assemblage is also mounted to the carrier and overlies a second region of the chip carrier. The module according to this aspect of the invention most preferably includes a metallic enclosure having top wall structure extending above the microelectronic units or assemblages and side wall structure extending downwardly from the top wall structure to the vicinity of the carrier. The enclosure also desirably has a medial wall extending to the vicinity of said carrier between the first and second regions. The enclosure, and particularly the medial wall structure, electromagnetically shields the first and second microelectronic units or assemblages from one another. Moreover, the enclosure desirably is in thermal communication with the chip or chips included in the microelectronic units or assemblages. The preferred modules according to this aspect of the invention can be used, for example, to provide a surface-mountable RF amplification unit which incorporates a pair of separate radio frequency amplification circuits.

A further aspect of the invention provides a packaged surface acoustic wave or "SAW" device. The packaged device according to this aspect of the invention includes a SAW chip having an acoustically active region on its front surface. The SAW chip desirably is mounted front-face-down on a chip carrier having an inner surface and an outer surface so that the active region of the SAW chip front surface is aligned with a hole in the chip carrier. The front surface is sealingly connected to the chip carrier around the periphery of the hole, so that the active region of the SAW chip is maintained free of encapsulants and contaminants. Preferred structures according to this aspect of the invention can provide a thin, surface-mountable packaged SAW device at low cost.

Yet another aspect of the invention provides A packaged semiconductor chip assembly including a first semiconductor chip incorporating one or more active components together with a passive chip incorporating one or more passive components selected from the group consisting of resistors and capacitors. The packaged chip according to this aspect of the invention also includes a chip carrier having terminals thereon. The chips are secured to the chip carrier, and at least some of the terminals are connected to at least one of said chips. The packaged chip according to this aspect of the invention desirably includes at least one inductor defined at least in part by features on the chip carrier, the at least one inductor being connected to at least one of the chips. As further explained below, the use of a passive chip to provide at least some of the resistors and capacitors affords significant savings in space and cost as compared to the use of discrete passive components, whereas formation of the inductor at least in part on the chip carrier allows the use of thick, low-resistance windings in the inductor to provide inductors with a high quality factor or "Q."

Still further aspects of the invention provide particular structures for inductors usable in the foregoing aspects of the invention and in other applications.

Additional aspects of the invention provide methods of mounting chips to circuit panels. Methods according to this aspect of the invention desirably use packaged chips or modules and circuit panels as discussed above. In a method according to this aspect of the invention, the terminals are bonded to the contact pads and the thermal conductor is bonded to the thermal conductor mounting in a single operation. Most preferably, the terminals and thermal conductor are soldered or otherwise metallurgically bonded to the contact pads and to the thermal conductor mounting. Preferably, the contact pads and the thermal conductor carry layers of solder before the packaged chip is assembled to the circuit panel. Alternatively, the solder may be provided on the contact pads and on the thermal conductor mounting of the circuit panel. In either case, the solder connections can be relatively thin layers of solder as, for example, 25-50 microns thick. Stated another way, the connection between the packaged chip and the circuit panel may be a "land grid array" rather than a ball grid array. The ability to use thin solder connections further enhances the electrical performance of the completed assembly, and minimizes the height of the assembly. Moreover, there is typically no need for a layer of dielectric material or "underfill" surrounding the solder connections between the connection component and the circuit panel. This simplifies the connection procedure. Where a heat spreader is to be bonded to a spreader mounting on the circuit board, the spreader desirably is provided in place on the chip package before the chip package is assembled to the circuit panel, and the spreader is bonded to the circuit panel in the same bonding operation used to bond the terminals and thermal conductor.

The features of the foregoing aspects of the invention can be combined with one another or used separately. Still other objects, features and advantages of the present invention will be more readily apparent from the detailed description of the preferred embodiments set forth below, taken in conjunction with the accompanying drawings.

BRIEF DESCRIPTION OF THE DRAWINGS

FIGS. 3, 4 and 5 are diagrammatic sectional views of packaged chips in accordance with further embodiments of the invention.

FIG. 21 is a diagrammatic sectional view of a module in accordance with yet another embodiment of the invention.

FIG. 22 is a fragmentary sectional view on an enlarged scale of a portion of the module shown in FIG. 21.

FIG. 25 is a fragmentary top plan view of a component used in a method according to a further embodiment of the invention.

FIG. 26 is a fragmentary bottom plan view of a further component used in conjunction with the component of FIG. 25.

FIG. 27 is a fragmentary, diagrammatic sectional view depicting an assembly made using the components of FIGS. 25 and 26 at a stage of manufacture.

FIG. 28 is a diagrammatic elevational view of a unit formed from the assembly of FIG. 27.

DETAILED DESCRIPTION

Figure 1:
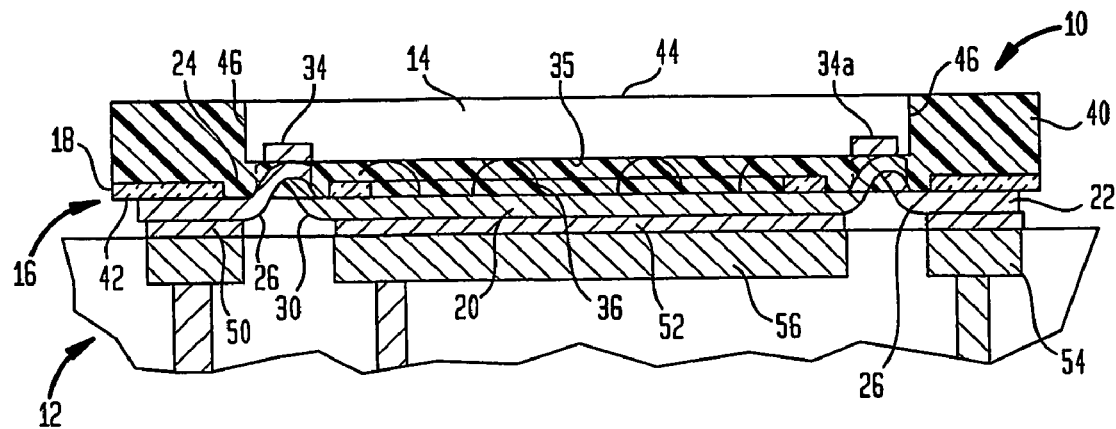
FIG. 1 is a diagrammatic sectional view of an assembly in accordance with one embodiment of the invention, including a packaged chip and a circuit board.
Figure 2:
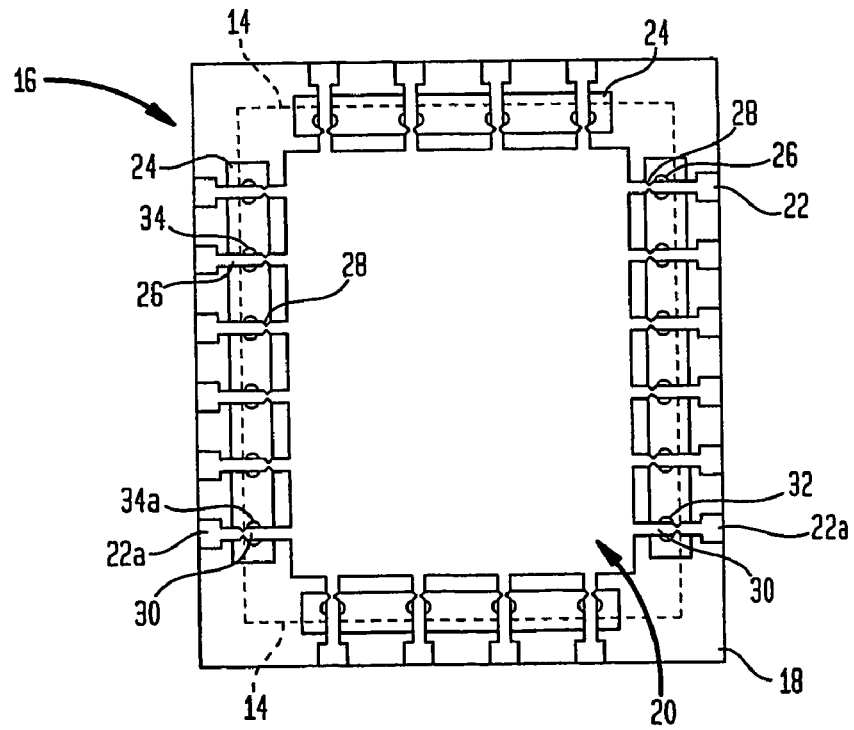
FIG. 2 is a diagrammatic plan view of the packaged chip depicted in FIG. 1 during one stage of manufacture.

FIG. 1 shows a diagrammatic sectional view of a chip assembly according to one embodiment of the invention. The assembly includes a packaged chip 10 mounted to a circuit board 12. The packaged chip 10 includes a chip or "die" 14 and a chip carrier 16. FIG. 2 shows a diagrammatic plan view of the die 14 and chip carrier 16 of FIG. 1 at an intermediate stage during fabrication of the packaged chip. The chip carrier 16 includes a dielectric layer 18 which desirably is a thin, flexible layer of a polymeric dielectric as, for example, polyimide or BT resin. The chip carrier has a large metallic thermal conductor 20 in a central region and a plurality of terminals 22 in a peripheral region surrounding the central region. The dielectric also has apertures or bond windows 24 extending through the dielectric between the terminals and the thermal conductor. Each terminal 22 has a terminal lead 26 associated with it. Each terminal lead 26 has a connection section projecting inwardly from the associated terminal across one of the bond windows 24. Each terminal lead also has a frangible section 28 between the connection section and the thermal conductor, so that the connection sections of the various terminal leads are connected to the thermal conductor through the frangible sections.

A few of the leads are thermal conductor leads 30. The thermal conductor leads are similar to the terminal leads except that the connection sections of the thermal conductor leads are connected directly to thermal conductor 20, without an intervening frangible section. The end of the connection section of each thermal conductor lead 30 remote from thermal conductor 20 is connected to a "dummy" terminal 22a by a frangible section 32. Thus, the frangible sections of the thermal conductor leads are disposed adjacent the outer edges of the bond windows 24, remote from thermal conductor 20.

The terminals, leads and thermal conductor form an electrically continuous structure. Thus, the leads can be plated or otherwise subjected to processes requiring electrical current without the need for any additional electrical commoning element. Preferably, the thermal conductor, leads and terminals are formed from a single layer of copper or copper alloy about 10-30 microns thick, more preferably about 15-20 microns thick, on the dielectric layer. A photoresist can be applied and patterned using conventional techniques so that regions of the copper or copper alloy layer can be selectively removed so as to leave the terminals, thermal conductor and leads in place. In other processes, the thermal conductor, leads and terminals can be formed by selective deposition of one or more metals, such as by patterning a photoresist and plating in areas which are not covered by the photoresist. The bond windows can be formed by etching the dielectric or by exposing the dielectric to radiation such as laser radiation. The fabrication procedure for the chip carrier can be essentially as shown and described in the patents incorporated by reference. Also, although the frangible sections 28 and 32 are illustrated in FIG. 2 as having width less than the width of the connection sections, essentially any type of frangible section can be employed. For example, the leads may incorporate frangible sections of reduced thickness and/or of different metallurgical structure and/or composition from the connection sections.

In fabrication of the package semiconductor chip, a die 14 is juxtaposed with the chip carrier so that the front surface 35 of the die faces toward the chip carrier and so that contacts 34 on the die are substantially aligned with the bond windows and with the connection sections of the terminal leads. Desirably, the arrangement of the leads is selected so that ground contacts on the die are aligned with the thermal conductor leads. In one manufacturing process, the dielectric is supported temporarily above the front or contact bearing surface of the die by a porous layer formed from a plurality of compliant elements or "nubbins" 36 (FIG. 1). As described in U.S. Pat. Nos. 5,706,174; 5,659,952; and 6,169,328, the disclosures of which are incorporated by reference herein, the nubbins typically are provided on the inner surface of the dielectric which faces toward the die. The connection sections of leads 26 and 30 may be bonded to the contacts by advancing a tool such as an ultrasonic or thermosonic bonding tool into the bond windows 24 so as to displace each connection section toward the die. This action breaks the frangible sections of the leads. Thus, the terminal leads 26 remain connected to terminals 22, and these terminals are disconnected from the thermal conductor. The thermal conductor leads 30 are disconnected from the associated dummy terminals 22a but remain connected to thermal conductor 20. Thus, at the end of the bonding process, the signal contacts 34 on the die are connected to the terminals whereas the ground contacts 34a are connected to the thermal conductor. The thermal conductor also serves as an anchor or support to facilitate breakage of the frangible sections associated with the terminal leads.

Following connection of the leads, the assembly is encapsulated by injecting a flowable, typically liquid encapsulant 40 between the die and the dielectric layer of the connection component. The encapsulant desirably also covers the edges 46 of the die, but does not cover the rear surface of the die. Techniques for applying an encapsulant are disclosed, for example, in U.S. Pat. Nos. 5,766,987; 6,049,972; and 6,046,076, the disclosures of which are also incorporated by reference herein. Typically, several connection components are provided as sections of a single dielectric layer tape, which incorporates several sets of terminals and several thermal conductors as aforesaid. Several chips are assembled to the various sets of terminals, and encapsulated, whereupon the tape is severed to provide individual packaged chips.

Other manufacturing processes can be employed. For example, the die can be attached to the connection component by a preformed pad of an adhesive material or "die attach" disposed between the front face 35 of the die and the connection component. Such a pad can be provided as a part of the connection component, or applied during the assembly operation. In another technique, die attach material is provided between the front face of the die and the connection component by dispensing a mass of uncured, flowable die attach onto the connection component or onto the die before assembling the die to the connection component.

After encapsulation, the packaged semiconductor chip has the configuration shown in FIG. 1. As best seen in that figure, the connection sections of the leads 26, 30 are bent toward the die and in contact with the contacts 34, 34a of the die. The encapsulant layer extends between the die and the dielectric element. In this embodiment, the terminals and thermal conductor are disposed on the bottom or outer surface 42 of the dielectric (the surface facing downwardly, away from the die in FIG. 1) and hence are exposed at this surface. The encapsulant surrounds the die but desirably does not overlie the rear surface 44 of the die, remote from the dielectric layer.

In this embodiment, the terminals are disposed outside of the lateral edges 46 of the die. Stated another way, the terminals "fan out" from the die. Because the encapsulant is not directly loaded in shear between a terminal overlying the surface of the die and the die itself, substantial movability of the terminals can be achieved even with an encapsulant having a substantial shear modulus and a substantial modulus of elasticity. Typical encapsulants such as silicone gels tend to have coefficients of thermal expansion ("CTE") substantially greater than that of the die and substantially greater than that of a circuit board to which the packaged chip will be mounted. In a fan-out structure, the fatigue stresses imposed on the leads during thermal cycling arise to some extent from the expansion of the encapsulant itself. Therefore, it is desirable to minimize the CTE of the encapsulant. For common encapsulants, there is an inverse relationship between CTE and modulus of elasticity. Thus, an encapsulant having lower CTE normally will have higher modulus of elasticity and higher shear modulus. Accordingly, the encapsulant 40 used in this embodiment desirably has a coefficient of thermal expansion less than about $200 \times 10^6/°$ C. and more desirably less than about $100 \times 10^6/°$ C. The encapsulant in this embodiment preferably has a modulus of elasticity between 0.1 GPa and 3 GPa, typically between 0.5 GPa and 3 GPa, as measured at room temperature. It is desirable to minimize variation in the properties of the encapsulant with temperature as, for example, in the range of temperatures from $-65°$ C. to $+125°$ C. As the thermal conductor 20 overlies the front or contact-bearing surface 35 of the die, that portion of the encapsulant disposed between the thermal conductor and the die will be in direct shear between the die and the thermal conductor due to differential thermal expansion and contraction of these elements. However, strain in this portion of the encapsulant is limited because the entire thermal conductor lies close to the center of the die. Moreover, the bond between the thermal conductor 20 and the thermal conductor mounting of the circuit panel 12, discussed further below, covers a substantial area and thus has substantial strength and fatigue resistance. For this reason as well, stress on this bond due to thermal effects tends to be less critical than stress on the bonds between the terminals and the contact pads. In a variant of this embodiment, the encapsulant may have non-uniform composition and properties as discussed below with reference to FIG. 3.

The packaged semiconductor chip is provided with thin layers of solder 50 on the terminals 22, 22a and with a thin layer of solder 52 on thermal conductor 20. Such thin layers can be applied by application of solder paste and subsequent volatilization of the organic carrier from the paste or by wave-soldering or dip-soldering techniques. Desirably, the solder layers are less than about 75 microns thick, most preferably between 25 and 50 microns thick. The solder layers can be applied before severing the tape to form individual packaged chips.

In an assembly technique according to a further aspect of the invention, the packaged semiconductor chip is assembled to a circuit board or other circuit panel 12 as shown in FIG. 1. In a single operation, using conventional surface-mounting soldering techniques, the terminals are soldered to the contact pads 54 of the circuit board, whereas the thermal conductor 20 is soldered to the thermal conductor mounting 56 of the circuit board. Most preferably, the bond between the thermal conductor and the thermal conductor mounting covers substantially the entire surface area of the thermal conductor, as, for example, at least about 80% of the thermal conductor surface area. Only a small fraction of the circuit board is illustrated. The contact pads 54 of the circuit board are connected by surface or internal connections of circuit panel 12 to appropriate signal-carrying traces and other electrical features of the circuit board, whereas the thermal conductor mounting 56 desirably is connected to a source of ground potential or other constant potential. Thus, after soldering the die is electrically connected to the appropriate signal connections of the circuit board through the terminals 22 and signal leads 26, whereas the die is connected to ground through the thermal conductor leads 30, thermal conductor 20 and thermal conductor mounting 56. The entire structure is quite thin. Typically, the entire structure is less than about 0.8 mm thick and more preferably less than 0.6 mm thick. In one example, the dielectric layer of the chip carrier is about 25-75 μm thick, and most desirably about 50 μm thick. The terminals, leads and thermal conductor are about 10-25 μm thick, and desirably about 18 μm thick, whereas the solder lands used to connect the structure to the circuit board are about 25-50 μm thick. In this embodiment, the encapsulant layer between the front face of the chip and the inner surface of the chip carrier is about 50-75 μm thick. The front face of the chip lies about 180 μm above the face of the circuit board when the assembly is mounted on the circuit board. These thicknesses are merely illustrative.

The thermal conductor 20 and the metallic bond between the thermal conductor and the thermal conductor mounting of the circuit board provide a thermally conductive heat transfer path from the die into the circuit board and also provide electrical shielding between the die and the circuit board. The entire structure is rugged and reliable. Inter alia, the bond between the thermal conductor and the thermal conductor mounting mechanically secures the packaged chip in place.

Figure 3:
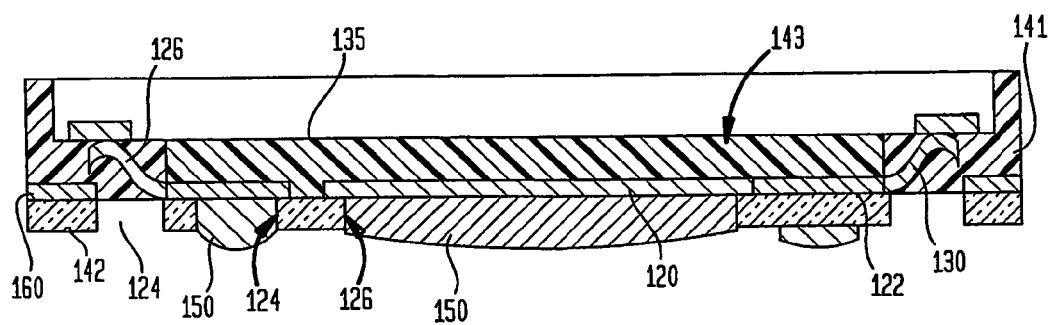

The packaged chip illustrated in diagrammatic sectional view in FIG. 3 is similar to the packaged chip discussed above. However, the thermal conductor 120 and terminals 122 are disposed on the inner surface of the dielectric. Openings 124 are formed in the dielectric in alignment with the terminals and another opening 126 is formed in alignment with thermal conductor 120 so that the terminals 122 and thermal conductor 120 are exposed at the outer surface 142 of the dielectric. Most preferably, the openings in the dielectric at the terminals and the thermal conductor are not plated. Rather, the bonding material such as solder 150 which is used to secure the packaged chip to the circuit board extends through the openings. This avoids the need for expensive plating operations. If desired, a ring of solder-wettable metal may be provided on the outer surface 142 around each such opening to control the shape of the solder masses.

Also, in the embodiment of FIG. 3, the terminals 122 are disposed in a region of the connection component which is disposed in alignment with the front surface 135 of the chip. The terminal leads "fan-in" or project inwardly towards the geometric center of the chip from the contacts on the chip to the terminals. Thus, the terminals are disposed inside the area bounded by the bond windows 124. An anchor 160 is disposed on the opposite side of the bond windows from the terminals. Prior to assembly with the die, the connection sections of the terminal leads 126 are connected to anchors 160 by frangible elements disposed adjacent the anchors. In this embodiment, the thermal conductor leads 130 are also connected to the anchors by frangible elements disposed adjacent to the anchors. The thermal conductor leads extend in regions which are not occupied by terminals and terminal leads. In this arrangement, the anchors serve as electrical commoning for plating during fabrication of the connection component. In the embodiment of FIG. 3, the encapsulant is of non-uniform composition. The region of the encapsulation disposed between the die and the thermal conductor has high thermal conductivity. Such high thermal conductivity can be imparted, for example, by adding thermally conductive filler to the encapsulant. Preferably, the filler itself is dielectric as, for example, boron nitride or alumina. Electrically conductive fillers such as silicon nitride or metals can be employed, preferably in concentrations and in particle sizes such that the encapsulant as a whole, even with the conductive filler, is electrically insulating. The portion 141 of the encapsulant surrounding the connection sections of the leads need not incorporate such a thermally conductive filler. Also, in this embodiment, the encapsulant 141 surrounding the connection sections of the lead and the periphery of the die may have physical properties different from that of the encapsulant 143 disposed between the die and the thermal conductor. For example, the modulus of elasticity of the encapsulant surrounding the leads may be 100 Mpa or less. In a further variant, the border between the two different types of encapsulants can be displaced inwardly, toward the thermal conductor and toward the center of the die front face, from the position depicted in FIG. 3, so that the softer, lower-modulus encapsulant 141 is disposed between the die and the terminals. The stiffer, higher-modulus and more thermally conductive encapsulant 143 is disposed between the die and the thermal conductor.

In the embodiment of FIG. 3, as in the embodiment of FIG. 1, the thermal conductor, the terminals and the leads are all formed from a single layer of a conductive metal such as copper or copper alloy. Placement of this layer on the side of the dielectric facing toward the die, referred to as a "circuits in" configuration, as in FIG. 3, provides the minimum package thickness and provides the maximum solder pad thickness for a given package thickness. However, an arrangement with the thermal conductor and terminals on the side of the dielectric facing away from the die, commonly referred to as a "circuits out" configuration, as in FIG. 1, provides additional spacing between the die and the thermal conductor. This can be advantageous where the die has components such as inductors which interact with a thermal conductor disposed in close proximity to the die.

The packaged chip shown in FIG. 4 has the "fan-out" arrangement of the packaged chip shown in FIGS. 1 and 2, but has the thermal conductor 220 and terminals 222 disposed on the inner or upper surface 238 of the dielectric layer as discussed above with reference to FIG. 3. Also, the packaged chip incorporates an element referred to herein as a heat spreader or enclosure 270 having a main portion or top wall structure 271 overlying the rear face 244 of the die (the face facing upwardly in FIG. 4) and having a side wall structure 272 projecting downwardly, beyond the front face 235 of the die to the vicinity of the chip carrier 212, at the periphery of the packaged chip. The side wall structure 272 desirably extends around the entire periphery of the packaged chip, but can be interrupted at locations located along the periphery of the chip. The side wall structure 272 terminates, at its bottom edge, in a flange 274 having a horizontal face 276 facing downwardly and hence facing in the same direction as the outer surface of the chip carrier. Desirably, the bottom edge of the side wall structure is disposed near the bottom surface 142 of chip carrier 212. The spreader or enclosure 220 can be formed from a metal such as copper, a copper alloy, aluminum or other thermally conductive metal. The spreader or enclosure 220 may have some flexibility so that the flange 274 can be displaced in the upward and downward direction during mounting as disclosed in U.S. Pat. No. 6,075,289, the disclosure of which is incorporated by reference herein. Desirably, at least the horizontal surface of the flange 276 is formed from or covered by a metal suitable for soldering. During manufacture, encapsulant 241 is injected or otherwise introduced into the interior of the hollow can or spreader 270. Flange 276 may be maintained free of encapsulant by providing a solder mask layer or other temporary layer (not shown) covering the flange and bridging the gap between the flange and the chip carrier. This temporary layer is removed after the encapsulant is cured. When the packaged chip is assembled to the circuit board 280, the horizontal surface 276 of the flange is soldered to a metallic spreader-mounting element 281 on the circuit board. The spreader-mounting element on the circuit board desirably is connected to a ground bus in the circuit board. The spreader or enclosure 270 provides additional heat dissipation capacity and also provides additional electrical shielding. As in the embodiment discussed above with reference to FIG. 3, the encapsulant desirably includes regions having different physical properties. Here again, the encapsulant 243 in the region disposed between the die and the thermal conductor desirably has high thermal conductivity. The space between the rear surface of the die and the main portion or top wall structure 271 of the spreader or enclosure 270 is filled with an encapsulant 245 having high thermal conductivity. This encapsulant also may be electrically conductive so as to form a ground connection to the rear surface of the die. Encapsulant 245 may be a composition including a polymer and a metal, or may be a metallic material such as a solder. In some cases, the entire rear surface of the die serves as a ground plane. Other dies have ground contacts 202 at specific locations on the rear surface. These contacts may be recessed into the rear surface, in depressions 204 open to the rear surface so that the contacts are exposed at the rear surface. For example, dies formed from gallium arsenide often are provided with such rear-surface ground contacts. Where the encapsulant 245 overlying the rear surface is electrically conductive, it desirably abuts the rear surface ground contacts 202 and desirably extends into depressions 204. This provides additional thermal conductivity from within the die to spreader or enclosure 270. In yet another variant, the encapsulant may extend into depressions 204 to provide enhanced thermal conductivity even if contacts 202 are not used. The encapsulant 241 surrounding leads 226 may have a lower modulus of elasticity than the encapsulant 245 at the rear surface.

In the embodiment of FIG. 5, the terminal leads 326 are connected to the contacts 334 on the die and formed into a vertically extensive disposition by a process similar to that described in U.S. Pat. Nos. 5,518,964; 5,830,782; 5,913,109; and 5,798,286 the disclosures of which are also incorporated by reference herein. As discussed in certain preferred embodiments of the '964 patent, leads which are initially provided on the connection component or chip carrier may have anchor ends connected to the terminals and tip ends remote from the terminals. The tip ends may be releasably secured to the connection component. All of the tip ends can be bonded to the various signal contacts on the chip in a single operation. After bonding the chip ends to the contacts, the die and the connection component are moved away from one another for a controlled, predetermined displacement thereby moving the tip ends of the leads away from the connection component and deforming the leads to a vertically extensive disposition. Alternatively, the signal leads 326 can be provided on the die. In this case, the tip ends are bonded to the terminals or to other structures of the connection component electrically connected to the terminals before the die and the connection components are moved away from another. The thermal conductor leads 330 which connect the thermal conductor 320 to the ground contacts on the die are formed in the same manner. Desirably, both the terminal leads and the thermal conductor leads are deformed to a vertically extensive disposition in the same movement of the die and connection component. The encapsulant 340 may be injected during or after the movement process. Because all of the leads in a given package can be connected and formed in a single operation or the package can incorporate numerous leads without substantial added cost. In particular, numerous thermal conductor leads 330 may be provided. The number of thermal conductor leads may exceed the number used for making the ground connections to ground contacts on the chip. The extra leads may be connected to "dummy" or unused contacts on the front surface of the chip. These dummy contacts need not be connected to internal electrical components of the chip. The numerous thermal conductor leads serve as metallic heat conductors extending between the die and the thermal conductor and further enhance the thermal properties of the package. In a variant of this approach, the thermal conductor leads which serve as active ground conductors, the thermal conductor leads connected to dummy contacts, or both may incorporate structures as disclosed in U.S. Pat. No. 5,557,501, the disclosure of which is also incorporated by reference herein. Also, as disclosed in U.S. Pat. No. 5,976,913, also incorporated by reference herein, movement of the die and the connection component in a deformation process can be controlled by restraining straps which are shorter and stronger than the other leads used in the assembly. Some or all of the thermal conductor leads can be formed as restraining straps.

Figure 6:
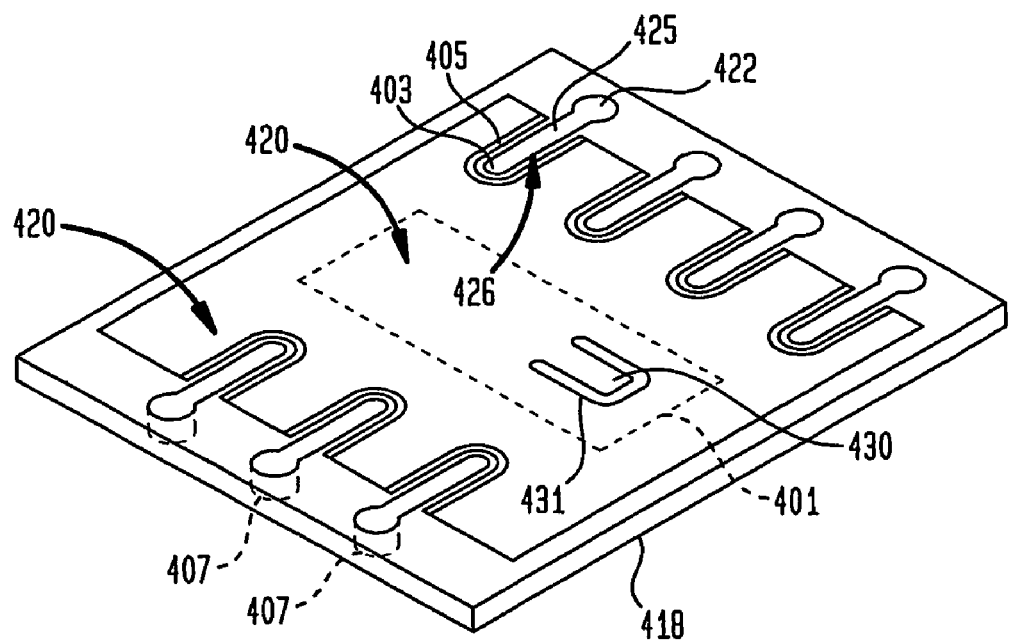
FIG. 6 is a diagrammatic perspective view of a component in accordance with a further embodiment of the invention.

Other forms of leads can be employed. For example, as disclosed in U.S. Pat. No. 6,228,686, the disclosure of which is hereby incorporated by reference herein, a sheet-like element may include a main region and lead region which are partially segregated from the main region by slots extending around each lead region. The slot extending around each particular lead region is interrupted at a fixed end of the lead so that the fixed end remains attached to the main region of the sheet. The connection component diagrammatically depicted in FIG. 6 has terminal leads 426 and thermal conductor leads 430 made in this manner. Thus, each of the tip ends 403 of terminal leads 426 is surrounded by a U-shaped slot 405 which extends toward the terminal 422 attached to such lead. Each terminal lead includes a conductive strip 425 attached to a portion of the dielectric layer 418 disposed inside slot 405. The terminals 422 are disposed on the inner or upper surface of the dielectric layer openings 407 provided to expose the terminals at the lower or outer surface of the dielectric. In this embodiment, the thermal conductor 420 is also disposed on the inner surface of the dielectric layer. Thermal conductor 420 extends beyond the opening 401 in the dielectric layer 418 which is used to expose the thermal conductor at the outer surface. Thus, the thermal conductor partially surrounds those regions of the sheet which constitute the terminal leads so as to provide additional RF shielding in the completed assembly. Thermal conductor lead 430 is formed by a portion of thermal conductor 420 surrounded by a U-shaped slot 431. In use, the tip ends of the terminal leads and the tip end of the thermal conductor lead are bonded to contacts on the die and the die and connection component are moved away from one another so as to bend the various leads out of the plane of the sheet in the manner described in the '501 patent. The reverse arrangement, with the conductive strips and thermal conductor on the lower or outer surface of the dielectric, also can be used. In this reverse arrangement, holes are formed in the dielectric at the tip ends of the terminal leads.

Figure 7:
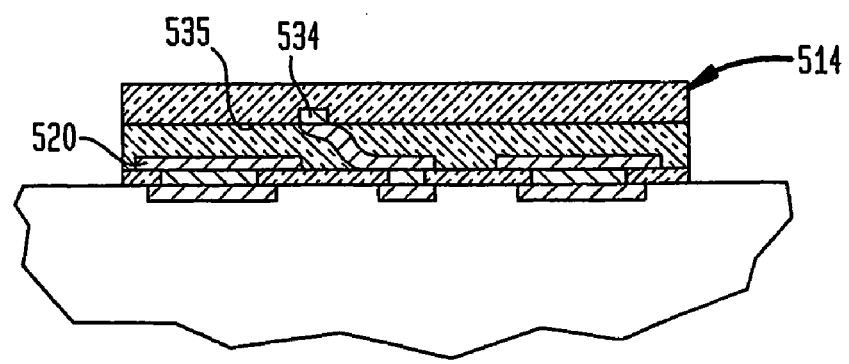
FIG. 7 is a diagrammatic sectional view of an assembly in accordance with a further embodiment of the invention.

In the embodiments discussed above with reference to FIGS. 1-6, the thermal conductor is provided in a central region of the connection component, aligned with the central region of the die front face. However, this is not essential. Thus, as depicted in FIG. 7, a die 514 may have contacts 534 disposed adjacent the center of the die front face 535. In this case, the thermal conductor 520 may be disposed adjacent the periphery of the die whereas the terminals may be disposed adjacent the center of the die.

Numerous further variations and combinations of the features discussed above can be utilized without departing from the present invention. For example, leads of the types shown in FIGS. 1-6 can be used in an assembly configured as shown in FIG. 7. Also, bonding materials other than solder may be employed to form the metallurgical bonds of the various assemblies. For example, the terminals, thermal conductor and/or spreader can be bonded to the metal elements of the circuit board by processes such as eutectic bonding, diffusion bonding, welding or thermosonic bonding, or by use of a composite material such as a metal-filled polymer, as, for example, a silver-filled epoxy. In the embodiments discussed above, the terminal leads which carry the signals are in the form of elongated strips having generally rectangular cross-sectional shapes when seen in sectional view along a cutting plane perpendicular to length of the lead. Short, strip-like leads are highly preferred because they provide low inductance connections between the terminals and the contacts of the chip. Desirably, each terminal lead has inductance below 0.3 nH and desirably below 0.2 nH. For even greater control of lead impedance, the leads can be provided as multi-conductor leads of the types described in published International Patent Application PCT/US96/14965, the disclosure of which is also incorporated by reference herein. As described therein, such a multi-conductor lead can incorporate a ground conductor or other constant-potential conductor extending parallel to the actual signal conductor, so as to form a stripline having well-controlled impedance. Alternatively or additionally, a multi-conductor lead can be used as a differential line in which one conductor carries a first copy of the signal and another conductor carries a further copy of the signal having the opposite sign. Such a differential signaling scheme provides substantial immunity to noise and also suppresses radiation of the signal from the line.

A packaged semiconductor module according to a further embodiment of the invention (FIG. 8) includes a first semiconductor chip 614 incorporating active semiconductor components. As used in this disclosure, the term "active semiconductor component" should be understood as referring to components such as transistors having a switching, amplification, photoelectric, light-emitting or other function different from resistance, capacitance and inductance. Most common semiconductor chips such as processors and memory chips incorporate thousand or millions of active components. Moreover, analog or mixed digital/analog chips such as radio frequency amplifiers also incorporate active components. Section 602 also includes a second chip 615 which incorporates at least some passive components and which preferably incorporates only passive components. As used in this disclosure, the term "passive component" should be understood as referring to resistors, inductors and capacitors. Also, the second chip 615 may or may not include semiconductor material. As used in this disclosure, the term "chip" should be understood as referring to an element which includes active components or which includes thin-film components, i.e., components having thicknesses less than about 4 µm, or both. Thus, the term "chip" as used in this disclosure includes common semiconductor chips and also includes components which consist of one or more thin-film components formed on dielectric materials such as glass or on semiconductors materials such as silicon. Chips 614 and 615 are arranged to cooperate with one another and cooperatively form a first microelectronic assemblage 602. The module also includes a second microelectronic assemblage 604 incorporating an active semiconductor chip 606 and a passive semiconductor chip 608. A chip carrier 616 is also provided. The chip carrier is generally similar to the carriers discussed above. Here again, it includes a dielectric layer 618 and has a top or upper surface 638 and a lower or bottom surface 642. The chip carrier has a first set of terminals 622 disposed in a first region 631 of the carrier and a second set of terminals 623 disposed in a second region 633. The chip carrier also has a first thermal conductor 620 in the first region 631 of the carrier and a second thermal conductor 621 in the second region 633. These elements of the chip carrier may be similar to the corresponding elements of the chip carriers discussed above. The chip carrier is provided with a first set of interconnecting conductive elements 660 in the first region. Each such interconnecting elements 660 includes a first lead 660a, a trace 660b and a second lead 660c at the opposite end of the trace. The second region is provided with a similar set of interconnecting elements 661. Additionally, the chip carrier has a central ground strip 662 which extends into and out of the plane of the drawing in FIG. 8. Ground strip 662 defines the border between the first region 631 (to the left in FIG. 8) and the second region 633 (to the right in FIG. 8).

The first electronic assemblage 602 overlies the top surface 638 of the chip carrier in the first region. The first or active chip 614 is connected by terminal lead 626 to the terminals 622 of the first set, and is also in thermal communication with the first thermal conductor 620. The relationship between the first chip 614 and the first terminals 622 and first thermal conductor 620 may be similar to those discussed above. For example, an encapsulant 641 having a relatively high thermal conductivity may be used to provide intimate thermal communication between the front or contact-bearing surface of first chip 614 (the surface facing downwardly in FIG. 8) and the first thermal conductor 620. The second or passive chip 615 of first assemblage 602 is connected by the first conductive elements 660 to the first chip 614. Thus, leads 660a are bonded to contact (not shown) on first chip 614, whereas leads 660c of the same conductive elements are bonded to contacts on the second or passive chip 615. Also, the second or passive chip 615 of assemblage 602 is connected by leads 664 to the central ground region 662.

Chips 606 and 608, constituting second assemblage 604 are mounted in essentially the same way and overlie the second region 633 of the chip carrier.

Figure 8:
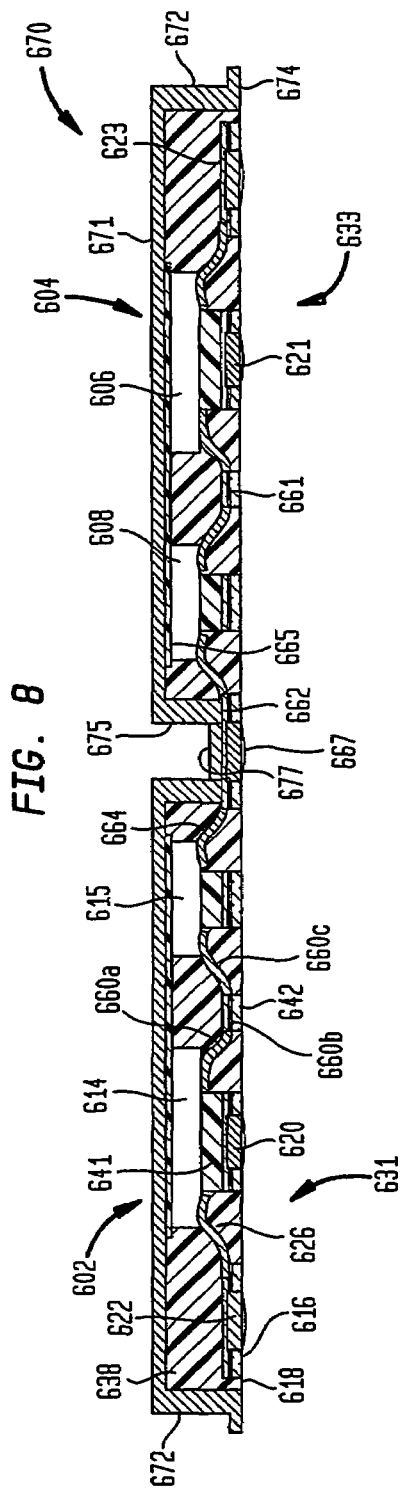
FIG. 8 is a diagrammatic sectional view of a module in accordance with yet another embodiment of the invention.

The module according to FIG. 8 also includes an enclosure 670. The enclosure 670 may be generally similar to the enclosure discussed above with reference to FIG. 4. Thus, the enclosure includes a top wall structure 671 extending above the chips of both assemblies and side wall structure 672 extending downwardly from the top wall structure to the vicinity of chip carrier 618. Here again, the rear surfaces of the various dies desirably are in thermal communication with the top wall structure 671. For example, a layer of an encapsulant die attach or solder having relatively high thermal conductivity may be provided between the rear surfaces of chips 606, 608, 614 and 615 and the top wall structure 671. In this embodiment as well, the bottom edge of the side wall structure is adapted for connection to a circuit panel. Thus, the bottom edge is provided with a flange 674 arranged for solder bonding or other metallurgical bonding to a corresponding structure on a circuit panel. In this embodiment, however, the enclosure also includes a medial wall structure 675 extending downwardly from the top wall structure 671. The medial wall structure 675 terminates in a plate 677. Plate 677 is metallurgically bonded to the central ground strip 662 and, thus, is both electrically and mechanically connected to the central ground strip 662. The central ground strip 662 desirably is bonded to the mating element of the circuit panel when the module is mounted to the circuit panel, as by one or more solder masses 667.

The enclosure 671 provides mechanical protection and reinforcement to the packaged module. Moreover, the enclosure cooperates with thermal conductors 620, 621 and other metallic components of the chip carrier to provide electromagnetic shielding for the components in both assemblages 602 and 604. Additionally, the medial wall structure 675, in cooperation with central ground strip 662, provides effective electromagnetic shielding between the two assemblages. Thus, assemblage 602 is effectively isolated from assemblage 604. This arrangement can be used to provide such isolation for any type of electronic circuits. It is especially useful in the case where multiple electronic assemblages must be provided in a compact unit. Merely by way of example, modules according to this aspect of the invention can be used in elements of RF transmitting and receiving circuits of cellular telephones. In such a dual-band radio frequency power amplifier, one assemblage 602 provides a radio frequency power amplifier operating in a first frequency band, whereas another assemblage 604 provides a radio frequency power amplifier operating in another frequency band. Both assemblages can operate independently, without cross-talk or interference, even though the components of both assemblages tend to emit substantial amounts of electromagnetic interference. In a variant of the structure shown in FIG. 8, each assemblage may be a unit which includes only one chip; similar advantages of electromagnetic isolation between units will be provided.

However, in the case where each unit includes passive components in addition to the active chip, fabrication of at least some of the passive components in each assemblage in an integrated chip, such as passive chips 615 and 608, makes the module considerably more compact than it would be if the passive components were provided as separate, discrete elements. Resistors and capacitors, in particular, can be fabricated readily in a chip. The materials and processing techniques to make the passive chips 608 and 615 may be different from those used to make the active chips 606 and 614. For example, the passive chips may be formed on materials such as glass rather than on silicon. In another example, the active chips may be formed in whole or in part from compound semiconductors such as III-V semiconductors or II-VI semiconductors, whereas the passive chips may be silicon-based chips. Thus, RF power amplifier chips formed from gallium arsenide and related semiconductors can be used in conjunction with silicon-based passive chips. In another example, the second or passive chips can be made with a larger minimum feature size or "line width" than the active chips, or vice-versa. Additionally, active chips originally made for use with discrete external passive components can be used in conjunction with the passive chips. Thus, compactness similar to that achievable by incorporating the passive components in the active chip itself can be achieved without the expense and difficulty of modifying the active chip itself.

Most preferably, at least some of the inductors used in the circuit are formed at least in part by the chip carrier or by the chip carrier in conjunction with leads and other structures extending to one or both of the chips. Although inductors can be fabricated in a passive or active chip, it is difficult to make inductors with high inductance and, particularly, with a high quality of factor or Q. The chip carrier typically is a "thick-film" structure, having metal layers more than about 2 μm thick, typically more than about 4 μm thick, and most preferably more than about 10 μm thick. Such thick layers commonly are formed by processes such as lamination of metal layers to a dielectric, plating or screen printing. Inductors formed at least in part in the chip carrier can employ large, thick, low-resistance conductors and can provide high inductance values with resistance far lower than that achievable in a thin film structure. Thus, it is desirable to provide at least some of the inductors incorporated in the circuit as structures defined in part or in whole by elements of the chip carrier, by leads extending between the chip carrier and a chip or both.

Figure 9:
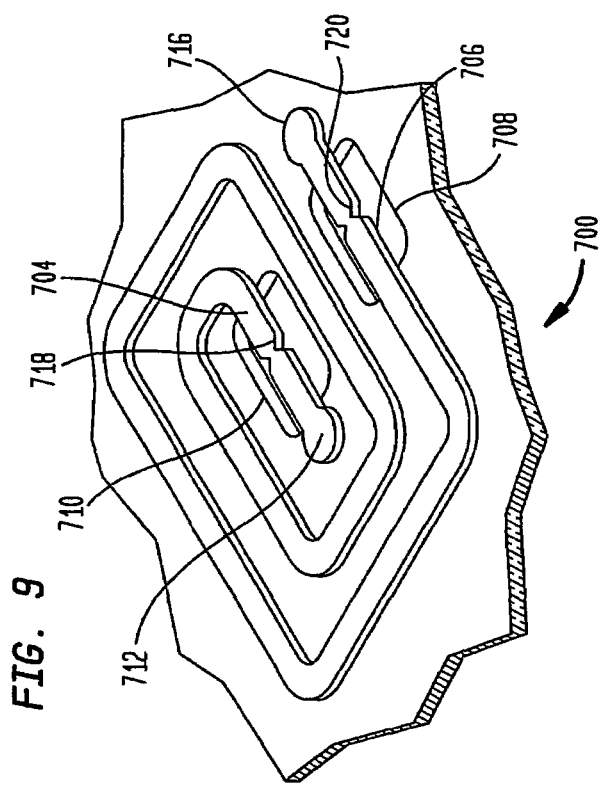
FIG. 9 is a fragmentary, diagrammatic perspective view of a component in accordance with a further embodiment of the invention prior to connection to a chip.
Figure 10:
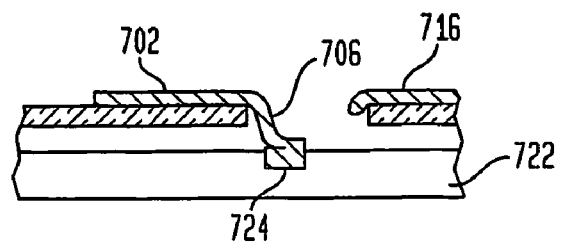
FIG. 10 is a fragmentary, diagrammatic sectional view of a packaged chip incorporating the component of FIG. 9.

As depicted in FIGS. 9 and 10, a substrate such as a chip carrier or other connection component used in conjunction with a semiconductor chip may include a dielectric layer 700 having a trace 702 extending generally in a spiral pattern on the dielectric layer. Trace 702 has leads 704 and 706 formed integrally with the trace. Thus, the trace and leads may be formed on a surface of the dielectric layer by a deposition process or by selective etching of a metallic layer overlying the dielectric layer. The connection component, and hence dielectric layer 700, is provided with openings or bond windows 708 and 710 aligned with leads 704 and 706. As fabricated, the leads 704 and 706 may be provided with anchors 712 and 716. As discussed above in connection with the terminal leads and thermal conductor leads, leads 704 and 706 may be connected to their respective anchors by frangible sections 718 and 720, respectively, when the connection component is manufactured. When the connection component or chip carrier is assembled with a chip 722, the spiral trace 702 overlies the front surface of the chip. Leads 704 and 706 are connected to contacts 724 on the chip and disconnected from their respective anchors, as seen in FIG. 10. The process used for connecting these leads may be identical to the process used for connecting the other leads such as the thermal conductor leads and ground leads discussed above. This is particularly desirable, inasmuch as it avoids the need for separate processing steps and separate equipment.

Figure 11:
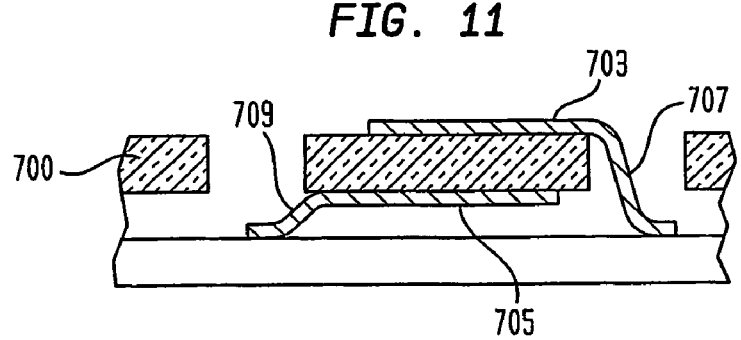
FIG. 11 is a fragmentary, diagrammatic sectional view of a packaged chip according to a further embodiment of the invention.
Figure 12:
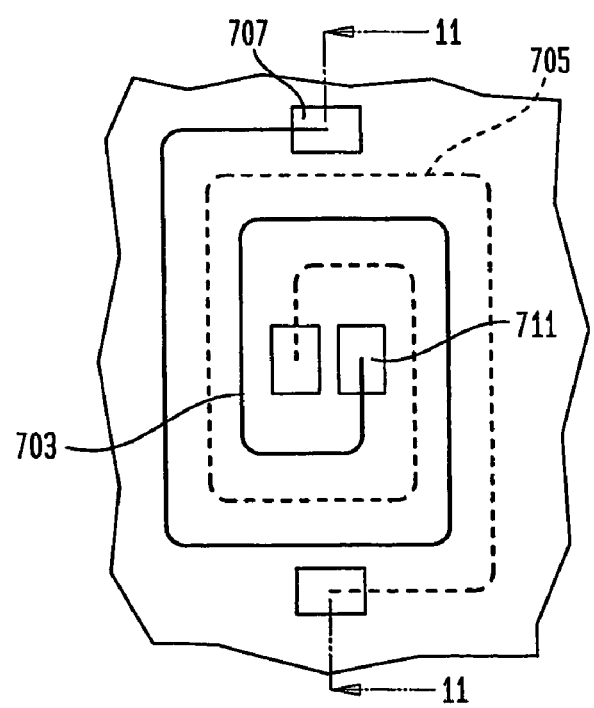
FIG. 12 is a fragmentary, diagrammatic plan view of a component incorporated in the packaged chip of FIG. 11.

As schematically illustrated in FIG. 11, a similar inductor can be made with two spiral coils 703 and 705 overlapping one another on opposite sides of the dielectric layer. Here again, these coils may be connected to a chip by leads 707 and 709, formed integrally with the coils themselves. Such an arrangement can be used to provide a high-value inductor or a transformer. As best seen in FIG. 12, the lead 711 at the inside of spiral coil 703 (on the outer surface of the dielectric layer) may be disposed inside of one or more turns of the spiral coil 705 on the inner surface of the dielectric layer. In this case, the inside lead 711 may extend to the chip through a bond window in the dielectric layer inside of or between turns of the other coil 705.

Figure 13:
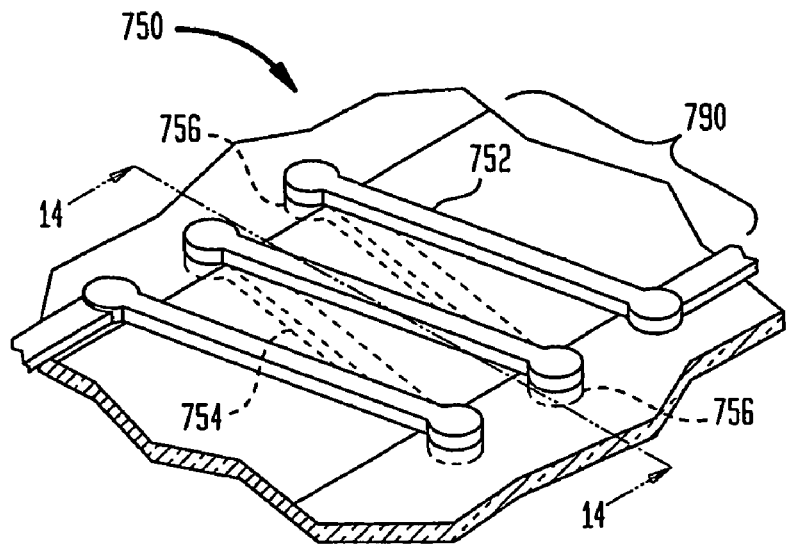
FIG. 13 is a fragmentary, diagrammatic perspective view of a component in accordance with yet another embodiment of the invention.

As shown in FIG. 13, an inductor can be formed on a connection component or chip carrier 750 having a planar or sheet-like structure including one or more dielectric layers by a zigzag arrangement of conductors 752 on a first side and conductors 754 on the opposite side of the structure. These conductors are electrically connected in series by via conductors 756 extending through the structure 750, so as to form a solenoid in the form of a flattened helix. Each turn of the helix is constituted by a first conductor 752, a via conductor 756, a second conductor 754 and another via conductor 756 at the opposite end of such second conductor, which in turn connects to a first conductor 752 constituting part of the next turn.

Figure 14:
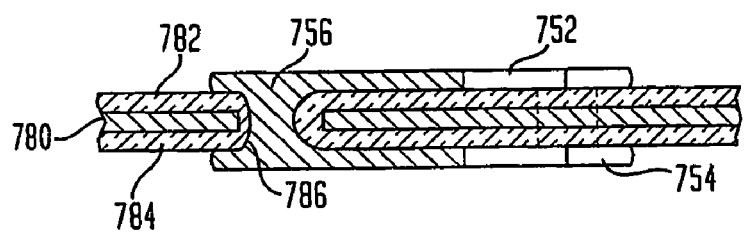
FIG. 14 is a diagrammatic sectional view taken along line 14-14 in FIG. 13.

As best seen in FIG. 14, the generally planar or sheet-like structure 750 may include an internal metallic layer 780, a first dielectric layer 782 on one side of the metallic layer and a second dielectric layer 784 on the opposite side of the metallic layer. The dielectric layers may be formed, for example, by coating a dielectric material onto the metallic layer. For example, the dielectric layers 782 and 784 may be formed by electrophoretic deposition on the metallic layer. These dielectric layers may be continuous with a dielectric coating 786 extending through holes in the metallic layer. One particularly desirable process for forming such a structure is disclosed in co-pending, commonly-assigned U.S. patent application Ser. No. 09/119,079, filed Jul. 10, 1998, the disclosure of which is hereby incorporated by reference herein. As best appreciated with reference to FIG. 14, the turns of the helical inductor will encompass a section 790 of the metallic layer. That section 790 may be formed from a ferromagnetic material. The remaining sections of the metallic layer may be formed from a non-ferromagnetic material. Alternatively, the metallic layer may be omitted entirely. In an alternative arrangement, the ferromagnetic core of the inductor may be provided as a discrete ferromagnetic element which is not part of a larger metallic layer. Such a discrete ferromagnetic element may be embedded within the dielectric structure.

Figure 15:
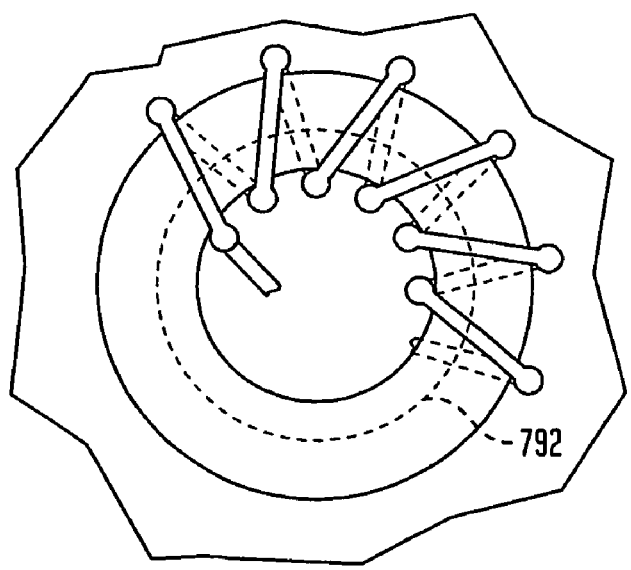
FIG. 15 is a fragmentary, diagrammatic plan view of a component in accordance with yet another embodiment of the invention.

In the embodiment depicted in FIG. 13, the solenoid extends along a straight path. As depicted in FIG. 15, a similar solenoid may be provided in a curved or toroidal structure extending along all or part of a loop-like path 792.

Figure 16:
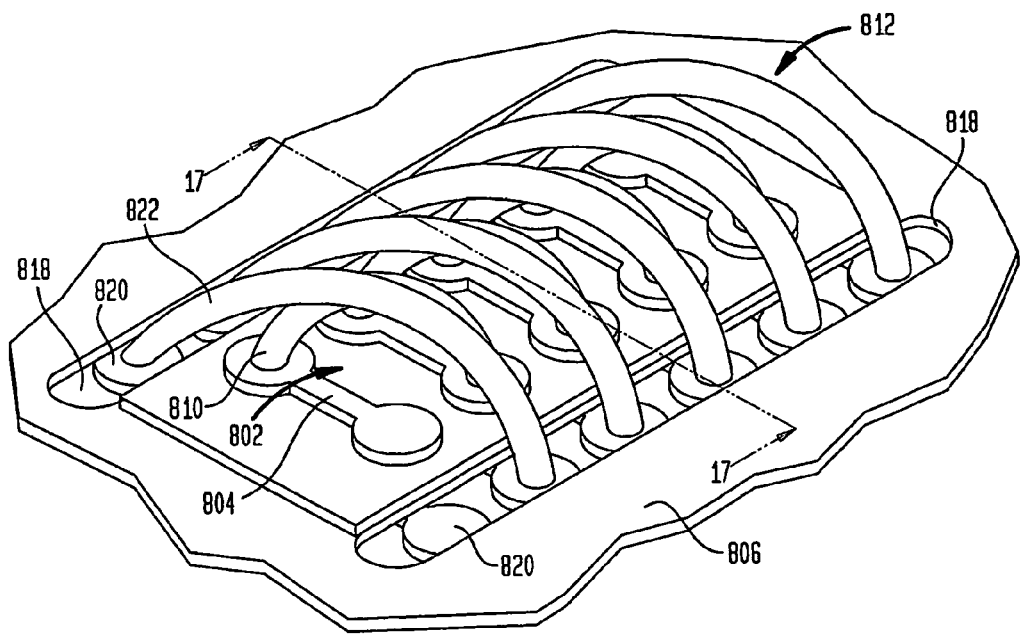
FIG. 16 is a fragmentary perspective view of a component according to yet another embodiment of the invention.
Figure 17:
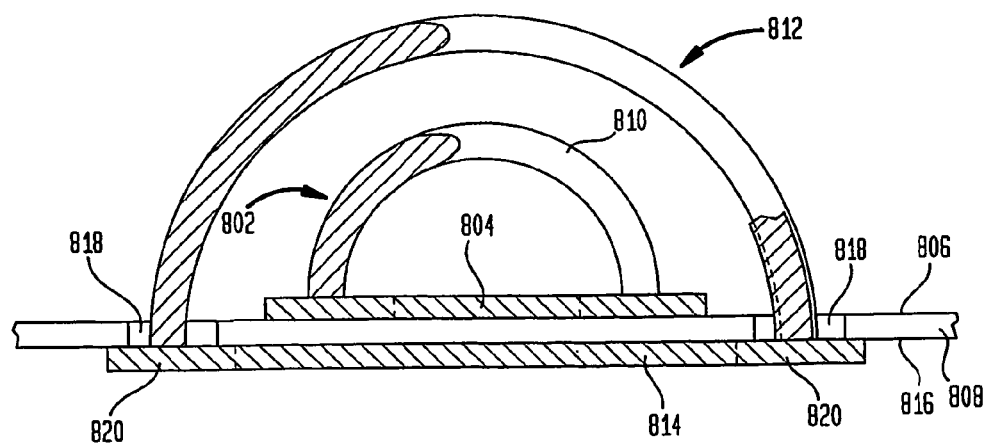
FIG. 17 is a fragmentary sectional view taken along line 17-17 in FIG. 16.

An inductor according to a further embodiment of the invention (FIGS. 16 and 17) includes a first or interior solenoid 802 formed by first side conductors 804 on a first side 806 of a substrate 808 incorporating a dielectric layer and by first loop conductors in the form of wire bonds 810 connected between conductors 804. The first loop conductors or wire bonds 810 project upwardly from the first surface 806 of substrate 808. Each such first loop conductor or wire bond extends from an end of one first side conductor 804 to the opposite end of another first side conductor 804. Each turn of interior solenoid 802 includes one first side conductor 804 and one first loop conductor or wire bond 810. A second or outer solenoid 812 is formed by second side conductors 814 on the second, opposite side 816 of the substrate 808. Bond windows 818 are provided in alignment with pads 820 at the ends of the second side conductors. Second loop conductors or wire bonds 822 extend from pads 820 through the bond windows 818 to the first surface and extend upwardly away from the first surface 806 of the substrate. The second loop conductors or wire bonds 822 and second side conductors 814 are connected in series with one another to form the outer solenoid 812. Each turn of the outer solenoid includes one second conductor 814 and one second loop conductor or wire bond 822. The inner and outer solenoids are concentric with one another. Inner solenoid 802 is surrounded by outer solenoid 812. A structure as depicted in FIGS. 16 and 17 may be used to provide a high-value inductor (where the inner and outer solenoids are electrically connected in series) or a transformer (where the inner and outer solenoids are not electrically connected to one another). This structure also can be made in a toroidal configuration.

Figure 18:
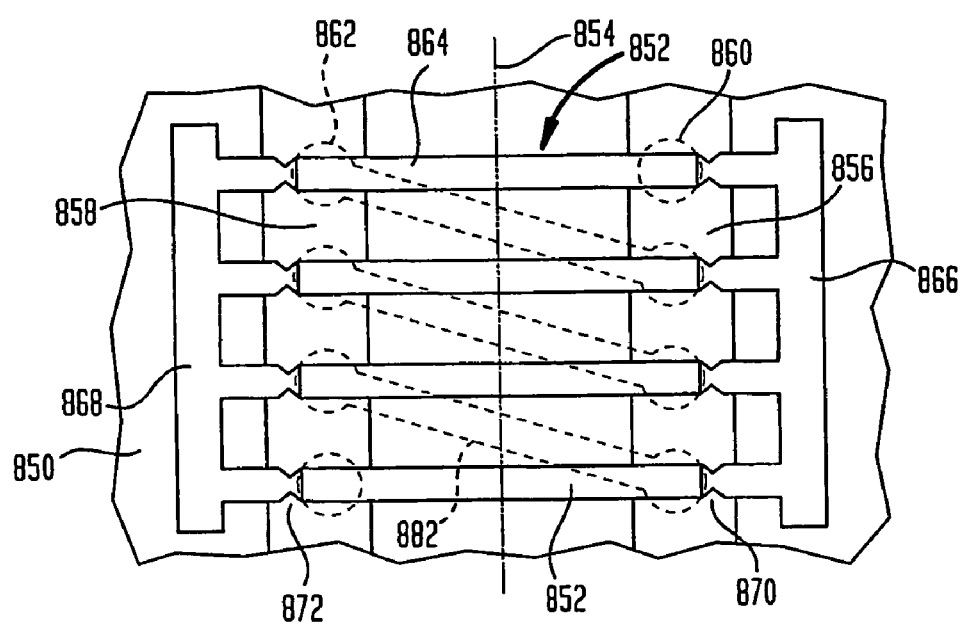
FIG. 18 is a fragmentary plan view of a packaged chip according to yet another embodiment of the invention.

A component usable in a further embodiment of the invention is depicted in fragmentary view in FIG. 18. The component according to this embodiment includes a substrate 850 incorporating a dielectric layer. The substrate desirably is generally planar or sheet-like. A plurality of conductive elements 852 are arrayed along a path 854. The substrate has bond windows 856 and 858 disposed on opposite sides of path 854. Each conductive element includes a first lead portion 860 aligned with bond window 856 on one side of the path, a second lead portion 862 aligned with the bond window 858 on the opposite side of path 854 and a trace portion 864 extending along the substrate between the lead portions. The ends of the lead portions remote from path 854 and remote from the trace portions 864 optionally may be connected to anchors 866, 868 by frangible portions 870, 872 as depicted in FIG. 18.

To form the indictor, the component is assembled with a chip, substrate or other element 880 (FIG. 19) having an array of conductors 882 arranged along a similar path 884. Conductors 882 are also elongated and extend generally transverse to path 884. Component 850 is juxtaposed with component 880 so that path 854 overlies path 884 and extends generally parallel thereto, and so that the bond windows 858 and 856 overlie the ends of conductors 882. The first lead portion of 860 of each conductive element on component 850 is bonded to one end of a conductor 882, whereas the second lead portion 862 is bonded to the opposite end of the next adjacent conductor 882 on the chip or other mating element 880. The connected conductive elements 852 and conductors 882 form a solenoid. Each turn of the solenoid includes a conductor 882 on element 880; a first lead portion projecting away from element 880 and towards the substrate 850; the trace portion 864 of the same conductive element and the second lead portion 862 extending downwardly toward 880, where it joins the conductor 882 constituting the next turn. Such an inductor can provide a relatively large cross-sectional area within each turn in a compact structure. Moreover, such an inductor can be formed by the same lead bonding techniques used to fabricate other connections in the packaged chip or module. A ferromagnetic core can be provided in such an inductor by providing a strip of ferromagnetic material in the substrate 850 or by mounting a strip of ferromagnetic material on the inner surface of substrate 850 (facing towards mating element 880) or on the surface of mating element 880. In a particularly preferred arrangement, such an inductor can be provided by providing the conductive elements 852 on the chip carrier and bonding the lead portions of the conductive elements to a passive chip or active chip, during fabrication of a packaged module. In this case, the conductors 882 can be thin-film components or, more preferably, can be thick-film elements applied on the surface of the chip.

A module in accordance with a further embodiment of the invention (FIG. 21) is generally similar to the module depicted in FIG. 8. However, the chip carrier or substrate 918 in this arrangement incorporates a "two-metal" structure, with terminals 922 on the outer or bottom surface and with terminal leads 926 projecting through bond windows or openings in the chip carrier to the chips. A metallic structure is also provided on the inner surface 938 of the chip carrier. Each of the active chips 914 and 906 in this embodiment is a surface acoustic wave chip. As best seen in FIG. 22, chip 914 has a front surface 935 with an acoustic transmission region 902. Internal elements 904 and 906 are arranged to transmit and receive acoustic waves along the surface of the chip within region 902. Various surface acoustic wave devices are well known in the art. These include filters for selecting a signal of a particular frequency and convolvers arranged to combine multiple signals with one another. It is important to keep surface region 902 free of other attached structures and encapsulants in the packaged device.

Chip carrier 918 has a hole 901 extending into the chip carrier from the inner surface 950. A metallic ring 911 is formed on the inner surface and surrounds hole 901. The metallic ring may be formed integrally with other metallic features on the inner surface, or may be separate therefrom. During manufacture, the front face 935 of chip 914 is juxtaposed with the inner surface of the chip carrier and is bonded to the chip carrier at ring 911. Thus, hole 901 provides a gas-filled cavity in alignment with the active surface region 902. The substrate does not contact the active surface region 902. A bonding material 903 desirably is provided between the inner surface of the chip carrier and the front face 935 of chip 914. For example, the bonding material may be a so-called "dry pad," i.e., a pre-formed pad of a die attach material. The die attach material 903 is provided with a pre-formed hole prior to placing the die attach material between the front face of the chip and the chip carrier extending entirely around hole 901. The die attach material forms a seal between the front face of the chip and the inner surface of the chip carrier. During a subsequent stage of manufacture, encapsulant 917 is applied. The seal between the front face 935 of the chip and the inner surface of the chip carrier prevents entry of the encapsulant into hole 901. Alternatively or additionally, if chip 914 is provided with a ring-shaped metallic bond pad on its front face, the bond pad may be metallurgically bonded to ring 911 so as to form a similar seal extending entirely around hole 901 and active surface region 902.

Hole 901 desirably is closed or "blind," so that the hole does not communicate with the bottom or outer surface 942 of the substrate. Hole 901 may be formed by any suitable technique used to for making blind vias in dielectric substrates. Desirably, hole 901 is partially filled with a metallic material. Thus, the hole 901 may have metallic via liner 907 extending along the wall of the hole. The via liner may join with a metallic element 909 on the outer or bottom surface of the substrate. This metallic element serves to close the hole. Moreover, metallic element 909 can be bonded by a solder mass 909, or other metallurgical bonding element, to a contact pad on the circuit panel. The via liner 907 thus serves as a heat-conducting element, so as to abstract heat from chip 914. In a variant of this structure, the chip carrier or substrate 918 is a "single metal" construction, with metallic features on only the outer or bottom surface 942, and hence ring 911 is omitted and hole 901 does not have a via liner. In a further variant, the substrate is a single-metal design with metallic features on only the inner or upper surface 950. The hole 901 in the dielectric of the substrate may be omitted, if ring 911 has sufficient thickness to maintain the active surface region 902 of chip 914 out of contact with the inner surface of the substrate. Alternatively, a hole may be formed partially or completely through the substrate within ring 911 to provide additional clearance. If the hole extends completely through the substrate, it may be closed by an additional element as, for example, a solder mask layer or other sheetlike structure applied on the bottom or outer surface of the substrate.

Structures according to this arrangement provide a gas-filled space in contact with the acoustic region of the surface acoustic wave chip, but also provide the other advantages achieved by mounting a chip in a package having a relatively thin chip carrier. Thus, the entire assembly can be substantially as compact as a unit which does not incorporate a surface acoustic wave device. Moreover, the structure is compatible from the manufacturing techniques used to make packaged chips and modules according to other embodiments of the invention, and the resulting packaged chip can be handled and mounted in the same manner as any other surface-mountable device. In the embodiments of FIG. 21, the surface acoustic wave chip is provided as part of a circuit or assemblage with a passive chip 915, and the module includes a similar assemblage with another surface acoustic wave chip 954 and passive chip 956. However, features such as the hole 901 and bonding material 903 can be used in packages which include only a single surface acoustic wave chip.

Figure 23:
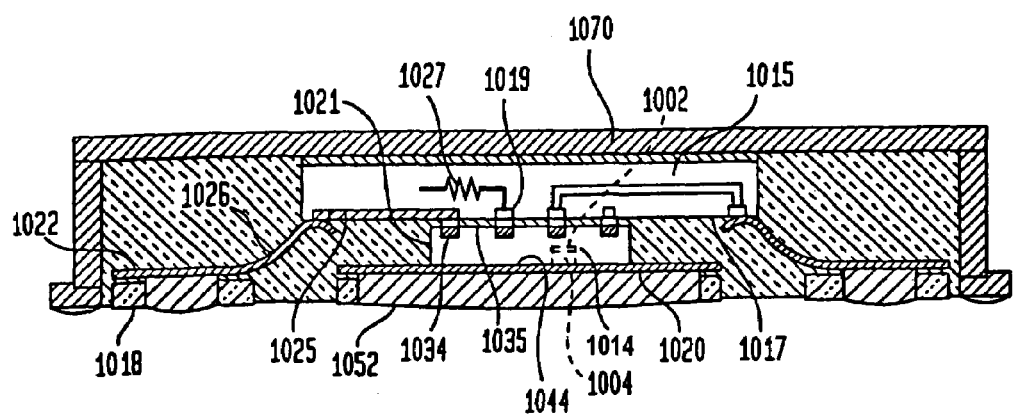
FIGS. 23 and 24 are diagrammatic sectional views of packaged chips according to still further embodiments of the invention.

A packaged chip assembly according to yet another embodiment of the invention (FIG. 23) incorporates a chip carrier 1018 similar to the chip carriers discussed above and also has an enclosure 1070 similar to those discussed above. First or active chip 1014 is mounted on the thermal conductor 1020 of the chip carrier, with the front or contact-bearing surface 1035 of the active chip facing upwardly, away from the chip carrier and thermal conductor, and with the rear surface 1044 of the active chip facing downwardly, toward the thermal conductor. A passive or second chip 1015 is mounted over the active chip 1014 so that the contact-bearing surface 1017 of this chip confronts the contact-bearing surface 1035 of the active chip. Contacts 1019 of the passive chip 1015 are bonded to contacts 1034 of the active chip as, for example, by small solder bonds, diffusion bonding or other metallurgical bonding technique. Alternatively, other interconnection techniques such as a silver-filled epoxy or other metal and polymer composite, or a layer of anisotropic conductive material may be provided between these chips so as to interconnect mutually facing contacts on the two chips. A composite material of the type sold under the trademark ORMET may be employed. Such a material includes a dielectric such as an epoxy, metal particles and a solder, and cures to form continuous conductors formed from the metal particles and solder extending through the dielectric.

The second or passive chip projects outwardly in horizontal directions generally parallel to the plane of chip carrier 1018 beyond the edges 1021 of the active chip. The passive chip has outer contacts 1023 disposed beyond the edges of the active chip, and has conductors 1025 connected to these outer contacts. Conductors 1025 may connect directly with contacts 1019 and, hence, directly with contacts 1035 of the active chip. The passive chip also incorporates passive components, desirably resistors and capacitors, symbolized by a resistor 1027. As will be appreciated, a number of passive components may be incorporated within the passive chip. Also, some or all of the outer contacts 1023 of the passive chip may be connected to or through such passive components. If the package includes additional discrete components (not shown) or additional chips (not shown), the connections between outer contacts 1023 and inner contacts 1019 may include these elements.

The front, contact-bearing surface 1017 of the passive chip faces downwardly, toward the chip carrier or substrate 1018. Thus, the outer contacts 1023 of the passive chip may be readily connected to the terminals 1022 of the chip carrier by leads 1026 similar to those discussed above. Moreover, because the rear surface 1044 of the active chip confronts the thermal conductor 1020, the rear surface of the active chip may be closely coupled to the thermal conductor so as to provide excellent heat transfer from the active chip to the thermal conductor and through the thermal conductor to the circuit panel. For example, the rear surface of the active chip may be coupled by a layer of solder or other metallic bonding material to the thermal conductor. The rear surface 1044 of the active die may be provided with recesses 1004 and rear surface contacts 1002 similar to the rear surface contacts 202 and recesses 204 discussed above with reference to FIG. 4. Here again, the rear surface contacts may serve as ground or power connections to the active die, and provide additional thermal conductivity 1020. As discussed above, the thermal conductor itself desirably is coupled to the thermal conductor mounting pad of the circuit panel by a large mass of solder or other metallic bonding material 1052. Additionally, the passive chip is coupled to enclosure 1070, as by a thin layer of die-bonding material or encapsulant having high heat conductivity, so that both the passive chip and the active chip can be cooled by heat transfer to enclosure 1070. Here again, inductors can be provided in the chip carrier itself or by structures such as those discussed above, including portions formed in the chip carrier and portions extending between the chip carrier and the passive chip.

An assembly according to yet another embodiment of the invention (FIG. 24) includes an active chip 1114 and a passive chip 1115 as discussed above with reference to FIG. 23. In this embodiment, however, the orientation of the chips is reversed. Thus, active chip 1114 is mounted above the passive chip 1115, and the front or contact-bearing surface 1135 of the active chip faces downwardly, toward the chip carrier 1118. The front surface 1117 of the passive chip 1115 faces upwardly, away from the chip carrier. The outer contacts 1123 of the passive chip are connected by leads in the form of wire bonds to terminals 1122 on the chip carrier. The rear surface of the active chip is in thermal communication with the top wall structure 1171 of the spreader or enclosure 1170, whereas the rear surface of the passive chip is in thermal communication with a thermal conductor 1120, which is bonded to a mating metallic element 1152 on the circuit board 1112 when the assembly is mounted on a circuit board. Thus, the passive chip 1115 and thermal conductor provide a thermal path between the active chip and the circuit board when the module is mounted to the circuit board. Moreover, the spreader or enclosure 1170 provides further thermal dissipation from the active chip to the surroundings.

Figure 24:
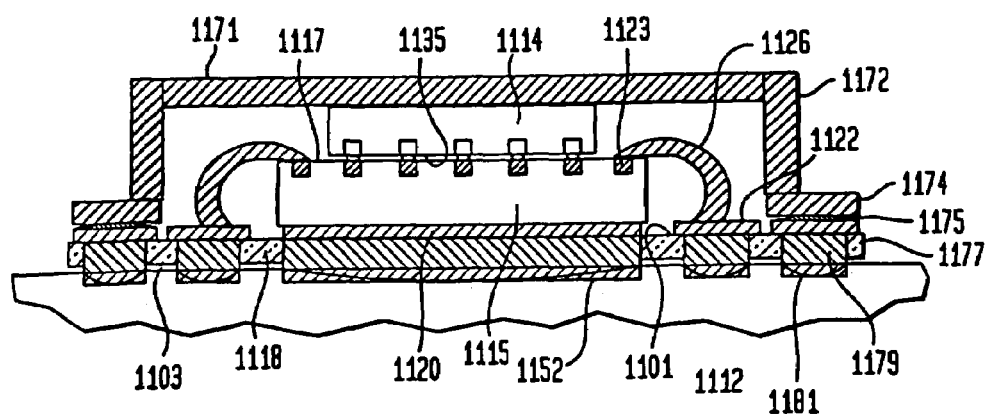

In the embodiment of FIG. 24, the side wall structure 1172 of the enclosure terminates just above the top or inner surface of chip carrier 1118. A flange 1174 at the bottom of the side wall structure is bonded to a metallic rim structure 1177 on the chip carrier, as by a solder or other metallic bonding material 1175 during manufacture of the module. Rim structure 1177 may be in the form of a continuous ring or a series of pads extending around the periphery of the chip carrier. The rim structure is exposed at the bottom or outer surface of the chip carrier, as by an opening or series of openings 1179 extending through the chip carrier. When the module is mounted to circuit board 1112, the rim structure is bonded to a mating element or set of elements 1181 on the circuit board, to provide a good heat dissipation path between enclosure 1170 and the board. This connection, as well as the connection of the thermal conductor 1120 to the board, can be accomplished in the same surface mounting operation used to connect terminals 1122 to the mating contacts on the circuit board. Moreover, element 1181 can be provide a ground connection to the enclosure. The embodiment of FIG. 24 uses a "circuits-in" configuration, with the metallic features of the chip carrier disposed on the inner or upper surface 1101. Similar structures can be provided in a "circuits-out" arrangement, with the metallic features on the lower or bottom surface 1103. In a further variant, the passive chip 1115 may have a conductive rear surface forming a common connection such as a ground or power connection, or may be provided with ground or power contacts (not shown) at discrete locations on the rear surface or in recesses open to the rear surface, similar to the rear surface contacts discussed above with reference to FIGS. 4 and 23.

A technique for making numerous packages incorporating spreaders or enclosures uses a substrate 1200 (FIG. 25) in the form of a continuous or semi-continuous sheet or tape having numerous regions 1202, each including the features needed to form a single package such as a package according to any of the embodiments discussed above. For example, each region 1202 may incorporate a thermal conductor or bottom shield 1204, leads 1206 (of which only a few are shown in FIG. 25), as well as terminals 1205 (FIG. 27). Each region desirably also includes bond windows 1208. In the unassembled state shown in FIG. 25, leads 1206 extend across the bond windows. Thus, each region may include a structure similar to the structure discussed above with reference to FIG. 2, or any of the other variants of such a structure needed to form the other packages described above. Tape 1200 also has a large number of enclosure openings 1212 spaced apart from one another and arranged in rows such that each region 1202 of the tape is substantially surrounded by rows of enclosure openings and such that rows of enclosure openings 1212 form borders between adjacent regions. The process also uses a top sheet 1214 desirably a conductive sheet such as a metallic sheet having rows of projections 1216 extending from one surface of the sheet. Projections 1216 are arranged with spaces 1217 between them. The projections are disposed in locations corresponding to the locations of enclosure openings 1212 and are arranged in rows corresponding to the rows of enclosure openings so that the projections 1216 subdivide sheet 1214 into numerous regions 1218.

In the assembly method, the conductive sheet 1214 is assembled with the substrate sheet 1200 so that each region 1218 of the conductive sheet overlies one region 1202 of the substrate sheet, and so that the projections 1216 on the conductive sheet are aligned with enclosure openings 1212 of the substrate sheet. In the assembled condition, the projections 1216 extend from sheet 1214 to substrate 1200, leaving a gap or space between the sheet and the substrate. In the particular embodiment depicted, each projection 1216 extends through one enclosure opening 1212 and extends slightly below the bottom or outer surface of sheet 1200.

The chips and other elements to be incorporated in the packages are assembled to the sheets so that the elements to be incorporated in each package are disposed between a region of conductive sheet 1214 and the corresponding region of substrate sheet 1200. In the embodiment depicted in FIG. 27, each package includes a single chip 1220, but the assembly method is applicable regardless of whether each package is to include one chip or a plurality of chips or other components. Assembly of the internal components may be performed by assembling the internal components to the conductive sheet, to the substrate sheet, or both, before the conductive sheet is assembled with the substrate sheet. For example, chip 1220 may be assembled to substrate sheet 1200 and temporarily supported on small elements or "nubbins" 1222, as discussed above. Alternatively, chip 1220 may be mounted on the inner surface of sheet 1214 (the surface facing toward substrate sheet 1200 in the assembled condition) so that the chip will be in the desired position when the conductive sheet is assembled to the substrate sheet. Chip 1220 is connected with the leads 1206 for terminals 1205 and for thermal conductor 1204 in the manner described above. In the embodiment illustrated, these connections are made using bond windows 1208, but the particular connections and manner of connecting will vary with the type of internal component employed. The connecting step also may be performed before or after the substrate sheet is united with the conductive sheet.

Where the substrate sheet 1200 incorporates bond windows 1208 or other openings apart from the enclosure openings 1212, a cover layer 1224 is applied on the outer or bottom surface of the substrate sheet so as to close the bond windows after making the connections with leads 1206. In the next stage of the process, an encapsulant is injected between the substrate sheet and the conductive sheet. The encapsulant may be injected at one or more edges of the sheets or at one or more points along the extent of the sheets. Because projections 1216 are spaced apart from one another, they do not form continuous barriers and, accordingly, encapsulant can flow to all of the various regions 1202 of the substrate sheet. Thus, as schematically indicated by arrows 1228 in FIG. 27, the encapsulant flows between the various regions through the spaces 1217 (FIG. 26) between the projections 1216. During this phase of the process, the sheets may be held between fixtures. Alternatively or additionally, the sheets may be held in frames. As described in greater detail in U.S. Pat. Nos. 6,329,224 and 6,133,639, the disclosures of which are hereby incorporated by reference herein, the injection step may be performed at a production station and the assembled sheets, with the injected encapsulant, may be removed from such production station and subjected to a curing process in an oven or at another location separate from the injection station. Some or all of the fixtures used to hold the sheets may be advanced from the injection station to the curing operation along with the assembled sheets. These elements may be disposable or other elements which can be provided in large quantities, so that numerous assemblies can be cured simultaneously.

After curing of the encapsulant, the sheets are severed as by cutting along cutting planes 1230 extending between adjacent regions 1202 of the substrate sheet and adjacent regions 1218 of the conductive sheet. The severing operation yields numerous units 1232 (FIG. 28). Each unit includes one region 1202 of the substrate sheet and the associated chips or other microelectronic components. Each such unit includes an enclosure or spreader having an upper or rear wall formed by one region 1218 of the conductive sheet and having side walls constituted by spaced-apart portions 1234 of the projections which were present on the conductive sheet. The side walls in this instance project downwardly beyond the substrate or chip carrier 1202. As discussed above, each such unit can be mounted to a circuit board with the bottom edges 1236 of the side walls being bonded to spreader connection pads on the circuit board.

The side walls formed by spaced-apart portions 1234 have gaps 1236 corresponding to the spaces 1217 (FIG. 26) between projections 1216. Nonetheless, the side walls can provide effective electromagnetic shielding, provided that the gaps are small enough in relation to the wave lengths of the electronic signals which must be confined within the unit or excluded from the unit. Desirably, the gaps 1236 have a maximum dimension less than the wavelength of the signals to be processed in the unit. In a typical example, the projections on the conductive sheet have dimensions of a few millimeters or less, typically about 1 millimeter, and the gaps 1236 likewise have dimensions of a few millimeters, typically about 1 millimeter or smaller.

In the embodiments discussed with reference to FIGS. 25-28, the projections 1216 extend entirely through the substrate. However, this is not essential. In an alternate embodiment, the projections may extend downwardly into proximity with the substrate but do not extend through the substrate. For example, the substrate may be provided with spreader mounting elements on its top or inner surface, similar to the spreader mounting elements or rim structure 1177 shown in FIG. 24.

The projections of the conductive sheet may be bonded to these spreader mounting elements when the conductive sheet is assembled to the substrate sheet. Also, in the embodiments discussed above with reference to FIGS. 25-28, each region 1202 of the substrate is associated with all of the internal components to be incorporated in a single package, and each unit produced by the severing operation includes only one region of the substrate sheet. In further embodiments, the severing operation may be varied so as to produce larger units or modules each incorporating two or more regions of the substrate sheet and the chips or other electronic elements associated with both regions of the substrate sheet. In such an arrangement, each module produced by the severing operation will include one or more rows of metallic projections 1216 disposed between adjacent regions 1202 of the substrate sheet. These projections form a medial wall structure isolating the various regions of the completed module from one another in a manner similar to the medial wall structures 675 discussed above with reference to FIG. 8. Also, the assembly and encapsulation methods discussed above can be employed to package microelectronic elements other than semiconductor chips or assemblies including semiconductor chips.

Figure 29:
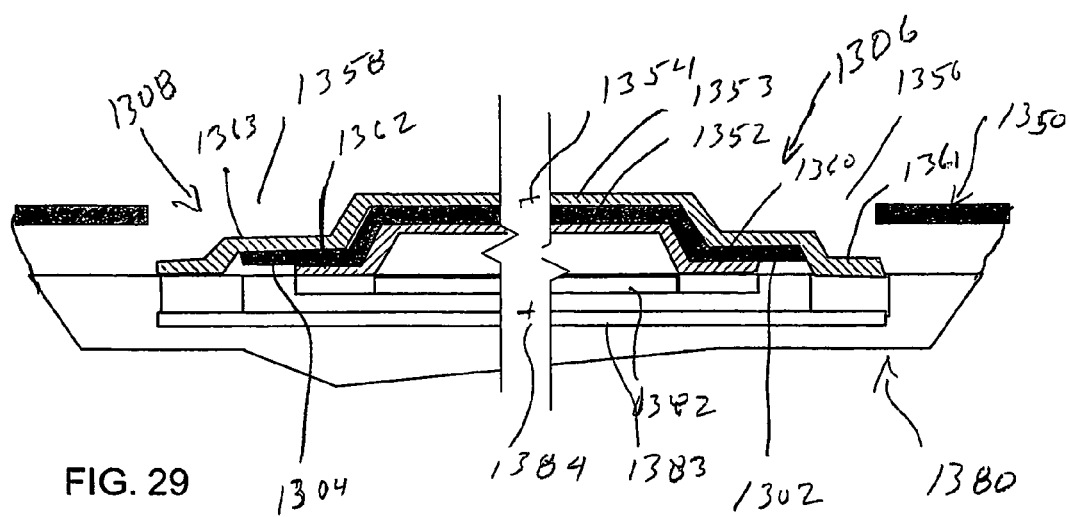
FIG. 29 is a diagrammatic sectional view of an assembly in accordance with yet another embodiment of the invention.

As illustrated in FIG. 29, the inductor-forming arrangement discussed above with reference to FIGS. 18-20 can be modified so as to form concentric inductors. As in the embodiment of FIG. 18, the component includes a substrate 1350 incorporating a planar or sheetlike element. Here again, the substrate may be the chip carrier used in a packaged semiconductor chip or module. A first set of conductive elements 1352 is arrayed along a path 1354 similar to the path 854 discussed above with reference to FIG. 18. Path 1354 extends into and out of the plane of the drawing in FIG. 29. Here again, each first set conductive element 1352 includes a first lead portion 1360 aligned with a bond window 1356 on one side of the path and a second lead portion 1362 disposed on the opposite side of path 1354 and aligned with a second bond window 1358 in the substrate, and a trace portion connecting the first and second lead portions 1360 and 1362. The component also includes a second set of conductive elements 1353 disposed on the opposite side of substrate 1350, i.e., on the upwardly-facing side in FIG. 29. Each such second-set conductive element also includes a trace portion, a first lead portion 1361 aligned with the first bond window 1356 on one side of the path and a second lead portion 1363 aligned with the second bond window 1358 on the opposite side of the path. In the embodiment illustrated, the first and second sets of conductive elements are aligned with one another, so that each first lead portion 1360 of the first set extends beneath a first lead portion 1361 of the second set and each second lead portion 1362 of the first set extends beneath a second lead portion 1363 of the second set. Each pair of first lead portions 1360 and 1361 is separated from one another by a strip 1302 of dielectric material formed integrally with substrate 1350 projecting partially across the bond window. The aligned first lead portions and strip 1302, thus, form a composite, multiconductor lead 1306. The structure of such multiconductor lead may be identical to the multiconductor lead structures described in U.S. Pat. Nos. 6,329,607 and 6,239,384, the disclosures of which are hereby incorporated by reference herein. Likewise, each pair of aligned second lead portions 1362 and 1363 is provided with a similar strip of dielectric material 1304 to form a further composite multiconductor lead 1308 on the opposite side of path 1354.

The mating element 1380 used with this component is provided with two arrays of conductors 1382 and 1383, each such array also being arrayed along a similar path 1384. The conductors 1382 of the first set desirably are electrically insulated from adjacent conductors 1383 of the second set. Here again, the conductors 1382 and 1383 are generally elongated and extend generally transverse to path 1384.

Figure 19:
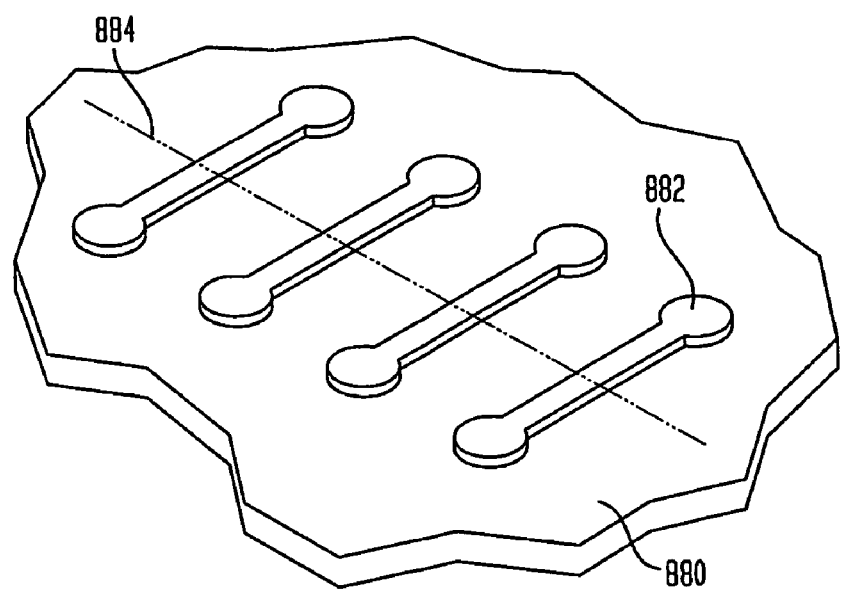
FIG. 19 is a fragmentary perspective view showing a portion of the chip incorporated in FIG. 18.
Figure 20:
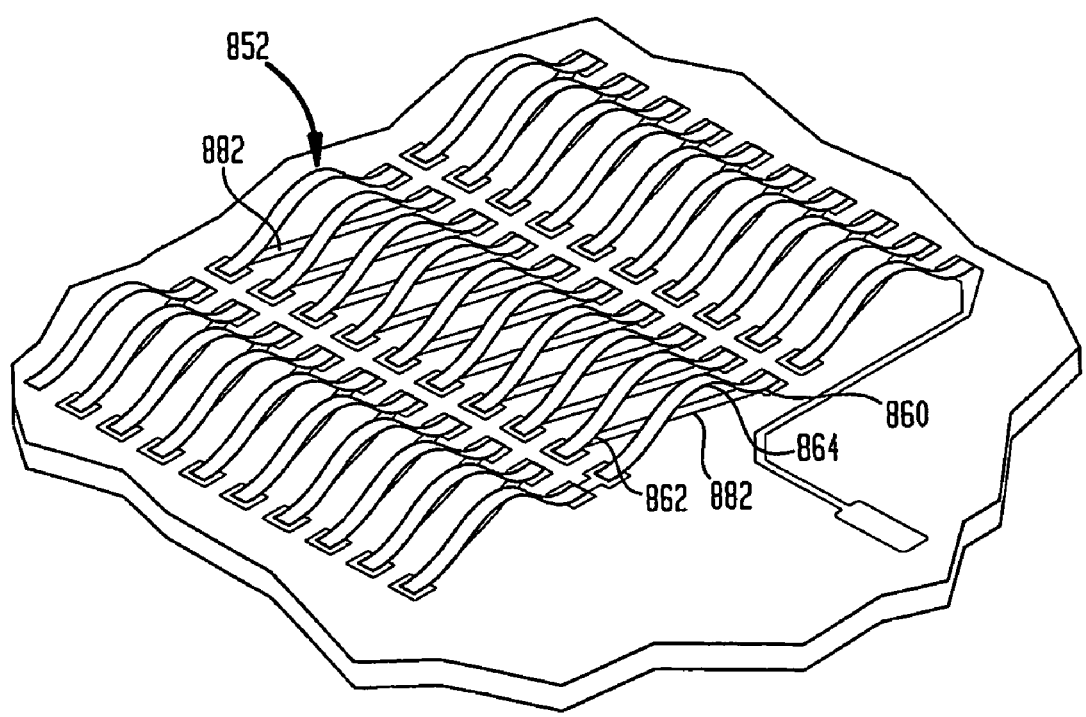
FIG. 20 is fragmentary, diagrammatic perspective view depicting certain elements in the packaged chip of FIGS. 18 and 19.

In a manner similar to the assembly operation discussed with reference to FIGS. 18-20, the component incorporating substrate 1350 is assembled to the mating element 1380 so that path 1354 overlies path 1384 and extends generally parallel thereto, and so that the bond windows 1356 and 1358 overlie the ends of the conductors 1382 and 1383.

As in the embodiment discussed above with reference to FIGS. 18-20, the first lead portion 1360 of each first-set conductive element on the component 1350 is aligned with one end of a conductor 1382 of the first set on component 1382, whereas the second lead portion 1362 is aligned with the opposite end of the next adjacent conductor 1382. Similarly, the first lead portion 1361 of each second-set conductive element is aligned with one end of a conductor 1383, whereas the second lead portion 1363 or each second-set conductive element is aligned with the opposite end of an adjacent conductor 1383. The aligned lead ends and conductor ends are bonded to one another. The procedures used for bonding ends of the multiconductor leads 1306 and 1308 can be as described in the aforementioned '607 and '384 patents. The resulting structure yields a pair of misted solenoids, one such solenoid being formed from the conductors 1382 of the first array and the conductive elements of the first set, the other such solenoid being formed from the conductors 1383 and the conductive elements of the second set.

In the embodiment discussed above with reference to FIG. 29, the number of second lead portions is equal to the number of first lead portions and, hence, the number of turns in each solenoid is the same. However, this is not essential. Thus, if some of the first lead portions are omitted or are not connected in the inner solenoid, the inner solenoid will have fewer turns than the outer solenoid. Likewise, if some of the second lead portions are omitted or not connected, the outer solenoid will have fewer turns.

Figure 30:
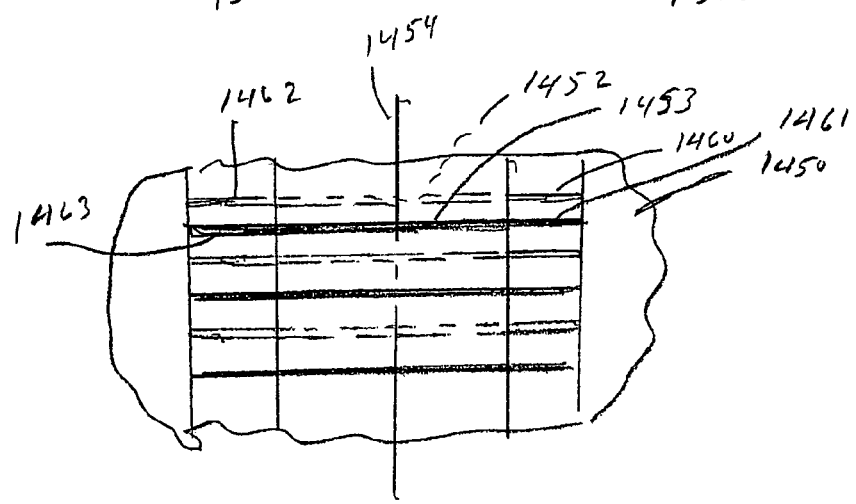
FIG. 30 is a diagrammatic top plan view of a component in accordance with a still further embodiment of the invention.

In a further variant (FIG. 30), the first-set conductive elements 1452 again extend on one surface of substrate 1450, whereas the second-set conductive elements 1453 extend on the opposite surface, but the lead portions of the first and second set are offset from one another in the direction along the length of the path 1454. Thus, first lead portions 1460 of the first set are interspersed in the lengthwise direction of the path with the first lead portions 1461 at one bond window, whereas the second lead portions 1462 of the first set are interspersed with the second lead portions 1463 of the second set at the opposite bond window. The various lead portions may be connected to a mating element such as a chip or other element similar to the element 1380 discussed above, having two separate sets of conductors. This arrangement will also provide concentric solenoids, one including the conductors of the first set and the other including the conductors of the second set. As in the other inductor embodiments discussed above, the paths 1354 (FIG. 29) and 1454 (FIG. 30) may be either straight or curved and may be close curves so as to form concentric toroidal solenoids.

As these and other variations and combinations of the features set forth above can be utilized, the foregoing description of the preferred embodiment should be taken by way of illustration rather than by limitation of the invention.

The invention claimed is:
1. A packaged semiconductor chip comprising:
  (a) a first semiconductor chip having an upwardly-facing front face, a downwardly-facing rear face, edges bound- ing said faces and contacts exposed at said front face, said first semiconductor chip including active components;

(b) a connecting element including passive components, said connecting element being electrically connected to at least some of said contacts, said connecting element overlying said front face of said first chip and projecting outwardly beyond said edges of said first chip;

(c) a chip carrier disposed below said rear face of said first chip, said chip carrier having a bottom surface facing downwardly away from said first chip and having a plurality of terminals exposed at said bottom surface, at least some of said terminals being electrically connected to at least some of said contacts of said first chip through said connecting element; and (d) deformable leads connecting said terminals to said connecting element.

2. A packaged semiconductor chip comprising:

(a) a first semiconductor chip having an upwardly-facing front face, a downwardly-facing rear face, edges bounding said faces and contacts exposed at said front face, said first semiconductor chip including active components;

(b) a connecting element including passive components, said connecting element being electrically connected to at least some of said contacts, said connecting element overlying said front face of said first chip and projecting outwardly beyond said edges of said first chip;

(c) a chip carrier disposed below said rear face of said first chip, said chip carrier having a bottom surface facing downwardly away from said first chip and having a plurality of terminals exposed at said bottom surface, at least some of said terminals being electrically connected to at least some of said contacts of said first chip through said connecting element, wherein said chip carrier includes a dielectric element having an exposed surface defining said bottom surface of said chip carrier and said terminals are exposed at said bottom surface within openings in said dielectric element; and (d) deformable leads connecting said terminals to said connecting element.

3. A packaged semiconductor chip as claimed in claim 1 or 2, wherein said deformable leads are formed integrally with said terminals.

4. A packaged chip as claimed in claim 1 or 2 wherein said connecting element projects beyond said edges of said first chip.

5. A packaged chip as claimed in claim 1 or 2 further comprising a hollow can encompassing said first chip, said can having a top wall extending above said first chip and having side walls extending downwardly from said top wall.

6. A packaged chip as claimed in claim 5 wherein said side walls of said can are attached to said chip carrier.

7. A packaged chip as claimed in claim 5 wherein said side walls of said can extend outside of the periphery of said chip carrier.

8. A packaged chip as claimed in claim 1 or 2 wherein said first chip includes active semiconductor components.

9. A packaged chip as claimed in claim 8 wherein said passive components in said connecting element include at least one passive component selected from the group consisting of resistors and capacitors.

10. A packaged chip as claimed in claim 9 further comprising at least one inductor formed at least in part on said chip carrier.

11. A packaged chip as claimed in claim 1 or 2 further comprising an electrically conductive enclosure element overlying said connecting element.

12. A packaged chip as claimed in claim 11 wherein said enclosure element is a hollow can having a rear wall overlying said connecting element and having side walls extending downwardly to the vicinity of said chip carrier.

13. A packaged chip as claimed in claim 1 or 2 wherein said chip carrier is a sheet-like element having thickness in the vertical direction less than about 150 microns.

14. A packaged chip as claimed in claim 13 wherein said chip carrier includes a thermal conductor underlying at least a major portion of said rear face of said first chip, said thermal conductor being in thermal communication with said first chip, said thermal conductor being exposed at said bottom surface of said chip carrier.

15. A packaged chip as claimed in claim 14 wherein said thermal conductor and said terminals are adapted for surface mounting to a circuit board.

16. A packaged chip as claimed in claim 1 or 2 wherein said chip carrier includes peripheral portions extending outwardly beyond the edges of said first semiconductor chip, all of said terminals being disposed in said peripheral portions.

17. A packaged chip as claimed in claim 1 or 2 wherein said connecting element is a second semiconductor chip.

18. A packaged chip as claimed in claim 17 wherein said first semiconductor chip and said second semiconductor chip include different semiconductor materials.

19. A packaged chip as claimed in claim 17 wherein said second semiconductor chip has minimum feature size larger than the minimum feature size of said first semiconductor chip.

20. A packaged semiconductor chip as claimed in claim 1 or 2 wherein said first semiconductor chip is a radio frequency power amplification chip.

21. A packaged semiconductor chip as claimed in claim 2, wherein contact surfaces of said terminals are separated from said bottom surface of said chip carrier by said dielectric element.

* * * * *